US011330298B2

(12) United States Patent
Ray et al.

(10) Patent No.: US 11,330,298 B2
(45) Date of Patent: May 10, 2022

(54) SIMPLIFIED INTRA CHROMA MODE CODING IN VIDEO CODING

(71) Applicant: QUALCOMM Incorporated, San Diego, CA (US)

(72) Inventors: Bappaditya Ray, La Jolla, CA (US); Geert Van der Auwera, Del Mar, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/855,462

(22) Filed: Apr. 22, 2020

(65) Prior Publication Data

US 2020/0413092 A1    Dec. 31, 2020

Related U.S. Application Data

(60) Provisional application No. 62/866,445, filed on Jun. 25, 2019, provisional application No. 62/871,548, filed on Jul. 8, 2019.

(51) Int. Cl.
*H04N 7/18*      (2006.01)
*H04N 19/593*    (2014.01)
*H04N 19/169*    (2014.01)
*H04N 19/186*    (2014.01)
*H04N 19/174*    (2014.01)

(52) U.S. Cl.
CPC ......... *H04N 19/593* (2014.11); *H04N 19/174* (2014.11); *H04N 19/186* (2014.11); *H04N 19/1887* (2014.11)

(58) Field of Classification Search
CPC ............... H04N 19/593; H04N 19/174; H04N 19/1887; H04N 19/186
USPC ..................................................... 375/240.12
See application file for complete search history.

(56) References Cited

U.S. PATENT DOCUMENTS

| | | | |
|---|---|---|---|
| 2012/0314766 A1* | 12/2012 | Chien | H04N 19/11 |
| | | | 375/240.12 |
| 2013/0163644 A1* | 6/2013 | Haug | H04B 1/38 |
| | | | 375/219 |
| 2013/0188700 A1* | 7/2013 | Guo | H04N 19/50 |
| | | | 375/240.12 |
| 2013/0272377 A1* | 10/2013 | Karczewicz | H04N 19/463 |
| | | | 375/240.02 |

(Continued)

OTHER PUBLICATIONS

Ghaznavi-Youvalari et al, Linear model based intra prediction in VVC test model (Year: 2020).*

(Continued)

*Primary Examiner* — Shan E Elahi
(74) *Attorney, Agent, or Firm* — Campbell C. Chiang; Shumaker & Sieffert, P.A.

(57) ABSTRACT

This disclosure describes video encoding and video decoding techniques for encoding and decoding video data in a chroma intra prediction mode. The techniques may improve the encoding and decoding process by simplifying aspects of the encoding and decoding process and by reducing a number of binarization tables used for the encoding and decoding. Moreover, reducing the number binarization tables may, in turn, reduce the amount of memory needed in an encoder device or decoder device to perform the video encoding or decoding process.

40 Claims, 10 Drawing Sheets

(56) References Cited

U.S. PATENT DOCUMENTS

| | | | |
|---|---|---|---|
| 2014/0003522 A1* | 1/2014 | Park | H04N 19/109 375/240.16 |
| 2016/0142732 A1 | 5/2016 | Chono | |
| 2016/0277762 A1* | 9/2016 | Zhang | H04N 19/593 |
| 2017/0150186 A1* | 5/2017 | Zhang | H04N 19/625 |
| 2018/0063527 A1* | 3/2018 | Chen | H04N 19/635 |
| 2018/0063531 A1* | 3/2018 | Hu | H04N 19/48 |
| 2018/0077426 A1* | 3/2018 | Zhang | H04N 19/46 |
| 2018/0205946 A1* | 7/2018 | Zhang | H04N 19/11 |

OTHER PUBLICATIONS

Bross et al., "Versatile Video Coding (Draft 5)", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1001-v8, 400 pp.

Chen J., et al., "Algorithm Description for Versatile Video Coding and Test Model 5 (VTM 5)", 14th JVET Meeting Mar. 19, 2019-Mar. 27, 2019; Geneva; (The Joint Video Exploration Team of ISO/IEC JTC1/SC29/WG11 and ITU-T SG.16), No. JVET-N1002, May 21, 2019, XP030205194, Retrieved from the Internet: URL:http://phenix.int-evry.fr/jvet/doc_end_user/documents/14_Geneva/wg11/JVET-N1002-v1.zip JVET-N1002-v1.docx, 70 pages.

Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16); URL: http://phenix.int-evry.fr/jvet/ ,, No. JVET-A1001 Feb. 24, 2016 (Feb. 24, 2016), XP030150000, 27 pages.

Chen J., et al., "CE6.a.4: Chroma intra prediction by reconstructed luma samples", JCTVC-E266-r1, JCTVC meeting, Geneva, Switzerland, Mar. 16-23, 2011, 10 pages.

Chen J., et al., "JVET-G1001: Algorithm Description ot Joint Exploration Test Model 7 (JEM7)", JVET-G1001-V1, Joint Video Exploration Team (JVET)Of ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7-p. 23, Paragraph 2.3.7.6, p. 17, Paragraph 2.3.5-p. 18, section 2, sections 2.1.1. 2.3.1.

"Information technology—Dynamic Adaptive Streaming over HTTP {DASH}—Part 1: Media Presentation Description and Segment Formats," ISO/IEC 23009-1, International Standard, Draft third edition, Jan. 9, 2017, 216 pp.

International Search Report and Written Opinion—PCT/US2020/029559—ISA/EPO—dated Jun. 15, 2020.

ITU-T H.265, Series H: Audiovisual and Multimedia Systems, Inftastructure of Audiovisual Services—Coding of Moving Video, High Efficiency Video Coding, The International Telecommunication Union, Jun. 2019, 696 Pages.

Ray B., et al., "Non-CE3: Intra Chroma Mode Coding Cleanup", Joint Video Experts Team (JVET) of ITU-T SG 16 WP 3 and ISO/IEC JTC 1/SC 29/WG 11, JVET-P0615-V2, 16th Meeting: Geneva, CH, Oct. 1-11, 2019, Document JVET-P0615-V1, pp. 1-7.

Ray B., et al., "Non-CE3: Intra Chroma Mode Coding Simplification", Joint Video Experts Team (JVET) of ITU-T SG 16 NP 3 and ISO/IEC JTC 1/SC 29/WG 11, 15th Meeting: Gothenburg, SE, Jul. 3-12, 2019, Document: JVET-O0671-v3, pp. 1-9.

Ray B., et al., "Non-CE3: Revised intra Chroma Mode Coding Simplification", Joint Video Experts Team (JVET) of ITU-T SG 16 WP 3 and ISO/IEC JTC 1/SC 29/WG 11, JVET-O1153-v3, 15th Meeting: Gothenburg, SE, Jul. 3-12, 2019, Document: JVET-O1153-v3, pp. 1-8.

Bossen F., et al., "JVET Common Test Conditions and Software Reference Configurations for SDR Video", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1010, pp. 1-6.

Bross B., et al., "Versatile Video Coding (Draft 6)", Joint Video Experts Team (JVET) of ITU-T SG 16 WP 3 and ISO/EC JTC 1/SC 29/WG 11, JVET-O2001-vE, Jul. 3-12, 2019, 455 pages.

Keating S., et al., "Non-CE3: CCLM Coding Bug fix", Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0512, pp. 1-3.

Zhang J., et al., "Non-CE3: Removal of CCLM Context Derivation Dependency", Joint Video Experts Team (JVET) of ITU-T SG 16 WP 3 and ISO/IEC JTC 1/SC 29/WG 11, 15th Meeting: Gothenburg, SE, Jul. 3-12, 2019, Document JVET-O0416-V3, pp. 1-5.

* cited by examiner

SIMPLIFIED INTRA CHROMA MODE CODING IN VIDEO CODING

This application claims the benefit of U.S. Provisional Patent Application 62/866,445, filed Jun. 25, 2019, and U.S. Provisional Patent Application 62/871,548, filed Jul. 8, 2019, the entire content of each of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes video encoding and video decoding techniques for encoding and decoding video data in a so-called "chroma intra prediction mode." The techniques may improve the encoding and decoding process by simplifying aspects of the encoding and decoding process and by reducing a number of binarization tables used for the encoding and decoding. Moreover, reducing the number binarization tables may, in turn, reduce the amount of memory needed in an encoder device or a decoder device to perform the video encoding or decoding process. The techniques may be applicable to one or more video compression standards and may be particularly applicable to the ITU-T H.266 standard, also referred to as Versatile Video Coding (VVC).

According to some test models of VVC, linear model (LM) modes can be used for encoding and decoding chroma blocks. LM modes may also be referred to herein as LM intra prediction modes. Moreover, according to some test models of VVC, a syntax element may be used to indicate whether all LM modes are disabled for a picture of the video data. According to these test models, if LM modes are disabled, then a first set of indexes is used to identify a chroma intra prediction coding mode used for a block, but if LM modes are enabled, then a second set of indexes (different than the first set) may be used. Moreover, two different binarization tables may be used to handle these two situations.

The use of two different sets of indexes for identifying intra coding modes and the two different binarization tables are both problems that may result from such test models of VVC that use a syntax element to indicate whether all LM intra prediction modes are disabled for a picture of the video data, which can cause complexity in the encoding and decoding process and may require additional memory to store the two binarization tables. The techniques of this disclosure can address these problems by defining a common set of indexes that can be used for intra mode identification, thereby eliminating two different sets of indexes that may otherwise be needed when LM modes are enabled and when LM modes are disabled. Furthermore, the techniques of this disclosure may address these problems defining a common binarization table that can be used for all situations associated with intra coding mode signaling, thereby reducing the number binarization tables from two to one, which can reduce the amount of memory needed in an encoder and a decoder for the encoding and decoding processes.

In one example, this disclosure describes a method of decoding video data. The method may include decoding a first syntax element that indicates whether all LM modes are disabled for a picture of the video data, decoding a second syntax element that indicates a chroma prediction mode index for a chroma block of the picture, and determining a chroma intra prediction mode for the chroma block based on the chroma intra prediction index. Determining the chroma intra prediction mode for the chroma block may comprise determining, based on the chroma prediction mode index for the chroma block being equal to a particular value, that the chroma intra prediction mode for the chroma block is inherited from a collocated luma block, wherein the collocated luma block is collocated with the chroma block and the particular value is a same value regardless of whether the first syntax element indicates that all LM modes are disabled for the picture. The method may further include decoding the chroma block based on the chroma intra prediction mode for the chroma block.

In another example, this this disclosure describes a method of encoding video data. The method may include encoding a first syntax element that indicates whether all LM modes are disabled for a picture of the video data, determining a chroma intra prediction mode for a chroma block of the picture, and determining a chroma intra prediction index to specify the chroma intra prediction mode for the chroma block. Determining the chroma intra prediction mode index may include selecting a particular value to specify that the chroma intra prediction mode for the chroma block is inherited from a collocated luma block, wherein the collocated luma block is collocated with the chroma block and the particular value is a same value regardless of whether the first syntax element indicates that all LM modes are disabled for the picture. The method may further include encoding a second syntax element that indicates the chroma prediction mode index for the chroma block of the picture.

In another example, this disclosure describes a video decoding device including a memory configured to store video data, and processing circuitry. The processing circuitry may be configured to: decode a first syntax element that indicates whether all LM modes are disabled for a picture of the video data, decode a second syntax element that indicates a chroma prediction mode index for a chroma block of the picture, and determine a chroma intra prediction mode for the chroma block based on the chroma intra prediction index. To determine the chroma intra prediction mode for the chroma block, the processing circuitry may be configured to determine, based on the chroma prediction mode index for the chroma block being equal to a particular value, that the chroma intra prediction mode for the chroma block is inherited from a collocated luma block, wherein the collocated luma block is collocated with the chroma block and the particular value is a same value regardless of whether the first syntax element indicates that all LM modes are disabled for the picture. The processing circuitry may decode the chroma block based on the chroma intra prediction mode for the chroma block.

In another example, this disclosure describes a video encoding device including a memory configured to store video data, and processing circuitry. The processing circuitry may be configured to encode a first syntax element that indicates whether all LM modes are disabled for a picture of the video data, determine a chroma intra prediction mode for a chroma block of the picture, and determine a chroma intra prediction index to specify the chroma intra prediction mode for the chroma block. To determine the chroma intra prediction mode index, the processing circuitry may be configured to select a particular value to specify that the chroma intra prediction mode for the chroma block is inherited from a collocated luma block, wherein the collocated luma block is collocated with the chroma block and the particular value is a same value regardless of whether the first syntax element indicates that all LM modes are disabled for the picture. The processing circuitry may encode a second syntax element that indicates the chroma prediction mode index for the chroma block of the picture.

In another example, this disclosure describes a video decoding device comprising means for decoding a first syntax element that indicates whether all LM modes are disabled for a picture of the video data, means for decoding a second syntax element that indicates a chroma prediction mode index for a chroma block of the picture; and means for determining a chroma intra prediction mode for the chroma block based on the chroma intra prediction index. Determining the chroma intra prediction mode for the chroma block may comprise determining, based on the chroma prediction mode index for the chroma block being equal to a particular value, that the chroma intra prediction mode for the chroma block is inherited from a collocated luma block, wherein the collocated luma block is collocated with the chroma block and the particular value is a same value regardless of whether the first syntax element indicates that all LM modes are disabled for the picture. The device may also include means for decoding the chroma block based on the chroma intra prediction mode for the chroma block.

In another example, this disclosure describes a video encoding device comprising means for encoding a first syntax element that indicates whether all LM modes are disabled for a picture of the video data, means for determining a chroma intra prediction mode for a chroma block of the picture, and means for determining a chroma intra prediction index to specify the chroma intra prediction mode for the chroma block. Determining the chroma intra prediction mode index may comprise selecting a particular value to specify that the chroma intra prediction mode for the chroma block is inherited from a collocated luma block, wherein the collocated luma block is collocated with the chroma block and the particular value is a same value regardless of whether the first syntax element indicates that all LM modes are disabled for the picture. The device may also include means for encoding a second syntax element that indicates the chroma prediction mode index for the chroma block of the picture.

In another example, this disclosure describes a computer-readable storage medium storing instructions that, when executed, cause one or more processors of a video decoding device to: decode a first syntax element that indicates whether all LM modes are disabled for a picture of video data; decode a second syntax element that indicates a chroma prediction mode index for a chroma block of the picture; and determine a chroma intra prediction mode for the chroma block based on the chroma intra prediction index. Determining the chroma intra prediction mode for the chroma block may comprise determining, based on the chroma prediction mode index for the chroma block being equal to a particular value, that the chroma intra prediction mode for the chroma block is inherited from a collocated luma block, wherein the collocated luma block is collocated with the chroma block and the particular value is a same value regardless of whether the first syntax element indicates that all LM modes are disabled for the picture. The instructions may also cause the one or more processors to decode the chroma block based on the chroma intra prediction mode for the chroma block.

In another example, this disclosure describes a computer-readable storage medium storing instructions that, when executed, cause one or more processors of a video encoding device to: encode a first syntax element that indicates whether all LM modes are disabled for a picture of video data, determine a chroma intra prediction mode for a chroma block of the picture, and determine a chroma intra prediction index to specify the chroma intra prediction mode for the chroma block. Determining the chroma intra prediction mode index may comprise selecting a particular value to specify that the chroma intra prediction mode for the chroma block is inherited from a collocated luma block, wherein the collocated luma block is collocated with the chroma block and the particular value is a same value regardless of whether the first syntax element indicates that all LM modes are disabled for the picture. The instructions may also cause the one or more processors to encode a second syntax element that indicates the chroma prediction mode index for the chroma block of the picture.

The details of one or more examples are set forth in the accompanying drawings and the description below. Other features, objects, and advantages will be apparent from the description, drawings, and claims.

DETAILED DESCRIPTION

Figure 1:
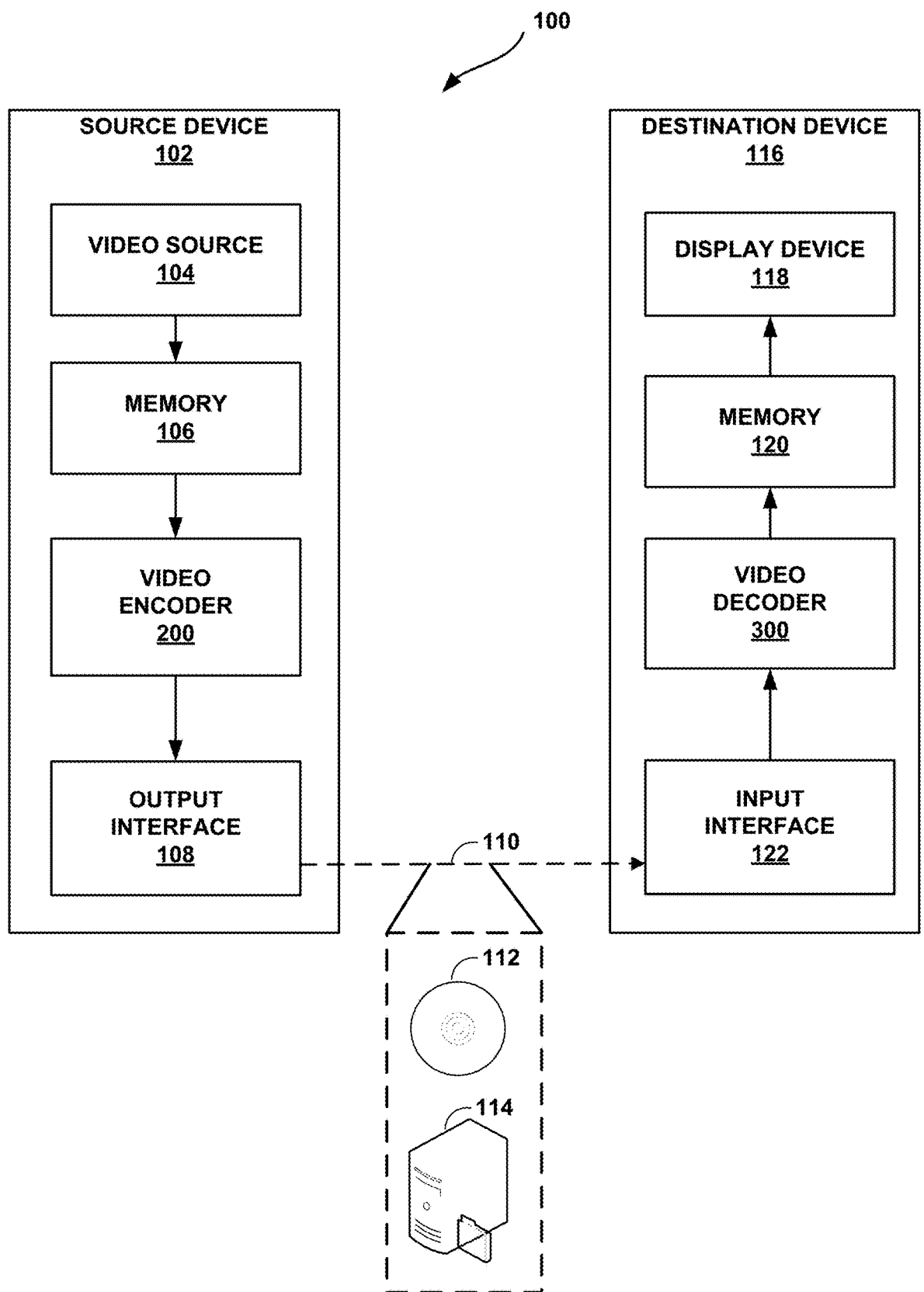
FIG. 1 is a block diagram illustrating an example video encoding and decoding system that may perform the techniques of this disclosure.

This disclosure describes video encoding and video decoding techniques for encoding and decoding video data in a so-called "chroma intra prediction mode." The techniques may improve the encoding and decoding process by simplifying aspects of the encoding and decoding process and by reducing a number of binarization tables used for the encoding and decoding. In particular, the techniques may eliminate the need for a first binarization table when linear model (LM) modes are enabled and a second binarization table when LM modes are disabled. Instead, a unified binarization table may be used to replace the two binarization tables. By reducing the number binarization tables may, the techniques may serve to reduce the amount of memory needed in an encoder device or decoder device to perform the video encoding or decoding processes as well as potentially reducing the physical complexity of hardware implementing the video encoding or decoding processes. The techniques may be applicable to one or more video compression standards and may be particularly applicable to the ITU-T H.266 standard, also referred to as Versatile Video Coding (VVC).

According to some test models of VVC, LM modes can be used for encoding and decoding chroma blocks. Moreover, according to some test models of VVC, a syntax element may be used to indicate whether all LM modes are disabled for a picture of the video data. According to these test models, if LM modes are disabled, then a first set of indexes is used to identify a chroma intra prediction coding mode used for a block, but if LM modes are enabled, then a second set of indexes (different than the first set) may be used. Moreover, two different binarization tables may be used to handle these two situations.

The use of two different sets of indexes for identifying intra coding modes and the two different binarization tables are both problems that may result from such test models of VVC that use a syntax element to indicate whether all LM modes are disabled for a picture of the video data, which can cause complexity in the encoding and decoding process and may require additional memory to store the two binarization tables. The techniques of this disclosure may address these problems by defining a common set of indexes that can be used for intra mode identification, thereby eliminating two different sets of indexes that may otherwise be needed when LM modes are enabled and when LM modes are disabled. Furthermore, the techniques of this disclosure may address these problems defining a common binarization table that can be used for all situations associated with intra coding mode signaling, thereby reducing the number of binarization tables from two to one, which can reduce the amount of memory needed in an encoder and a decoder for the encoding and decoding processes as well as potentially reducing the physical complexity of devices that implement the encoding and decoding processes.

By eliminating two binarization tables and replacing them with one unified binarization table, mode indexes can be made consistent for situations when LM modes are enabled relative to situations when LM modes are disabled. Such simplifications and memory reduction advantages can be realized without any negative impact on compression and without any negative impact on encoding and coding efficiency.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may include any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for simplified intra chroma mode coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for simplified intra chroma mode coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may include an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 5)," Joint Video Experts Team (WET) of ITU-T SG 16 WP 3 and ISO/IEC JTC 1/SC 29/WG 11, 14$^{th}$ Meeting: Geneva, CH, 19-27 Mar. 2019, JVET-N1001-v8 (hereinafter "VVC Draft 5"). J. Chen, Y. Ye, S. Kim, "Algorithm description for Versatile Video Coding and Test Model 5 (VTM5)," 14th JVET Meeting, Geneva, CH, March 2019, JVET-N1002 (hereinafter, "VTM5") is a test model for VVC. The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

This disclosure describes video encoding and video decoding techniques for encoding and decoding video data in a so-called "chroma intra prediction mode." The techniques may improve the encoding and decoding process by simplifying aspects of the encoding and decoding process and by reducing a number of binarization tables used for the encoding and decoding. In particular, the techniques may eliminate the need for a first binarization table when LM modes are enabled and a second binarization table when LM modes are disabled. Instead, a unified binarization table may be used to replace the two binarization tables. By reducing the number binarization tables, the techniques may serve to reduce the amount of memory needed in an encoder device or decoder device to perform the video encoding or decoding process. The techniques may be applicable to one or more video compression standards and may be particularly applicable to the ITU-T H.266 standard, also referred to as VVC.

According to some test models of VVC, LM modes can be used for encoding and decoding chroma blocks. Moreover, according to some test models of VVC, a syntax element may be used to indicate whether all LM modes are disabled for a picture of the video data. According to these test models, if LM modes are disabled, then a first set of indexes is used to identify a chroma intra prediction coding mode used for a block, but if LM modes are enabled, then a second set of indexes (different than the first set) may be used. Moreover, two different binarization tables may be used to handle these two situations.

The use of two different sets of indexes for identifying intra coding modes and the two different binarization tables are both problems that may result from such test models of VVC that use a syntax element to indicate whether all LM modes are disabled for a picture of the video data, which can cause complexity in the encoding and decoding process and may require additional memory to store the two binarization tables. The techniques of this disclosure may address these problems by defining a common set of indexes that can be used for intra mode identification, thereby eliminating two different sets of indexes that may otherwise be needed when LM modes are enabled and when LM modes are disabled. Furthermore, the techniques of this disclosure may address these problems defining a common binarization table that can be used for all situations associated with intra coding mode signaling, thereby reducing the number of binarization tables from two to one, which can reduce the amount of memory needed in an encoder and a decoder for the encoding and decoding processes.

By eliminating two binarization tables and replacing them with one unified binarization table, mode indexes can be made consistent for situations when LM modes are enabled relative to situations when LM modes are disabled. Such simplifications and memory reduction advantages can be realized without any negative impact on compression and without any negative impact on encoding and coding efficiency.

More generally, video encoder 200 encodes data representing the prediction mode for a current block. For example, for inter-prediction modes, video encoder 200 may encode data indicating which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

As mentioned above, video encoder 200 and video decoder 300 may apply CABAC encoding and decoding to values of syntax elements. To apply CABAC encoding to a syntax element, video encoder 200 may binarize the value of the syntax element to form a series of one or more bits, which are referred to as "bins." In addition, video encoder 200 may identify a coding context. The coding context may identify probabilities of bins having particular values. For instance, a coding context may indicate a 0.7 probability of coding a 0-valued bin and a 0.3 probability of coding a 1-valued bin. After identifying the coding context, video encoder 200 may divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If a bin of the syntax element has the value associated with the lower sub-interval, the encoded value may be equal to the lower boundary of the lower sub-interval. If the same bin of the syntax element has the value associated with the upper sub-interval, the encoded value may be equal to the lower boundary of the upper sub-interval. To encode the next bin of the syntax element, video encoder 200 may repeat these steps with the interval being the sub-interval associated with the value of the encoded bit. When video encoder 200 repeats these steps for the next bin, video encoder 200 may use modified probabilities based on the probabilities indicated by the identified coding context and the actual values of bins encoded.

When video decoder 300 performs CABAC decoding on a value of a syntax element, video decoder 300 may identify a coding context. Video decoder 300 may then divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If the encoded value is within the lower sub-interval, video decoder 300 may decode a bin having the value associated with the lower sub-interval. If the encoded value is within the upper sub-interval, video decoder 300 may decode a bin having the value associated with the upper sub-interval. To decode a next bin of the syntax element, video decoder 300 may repeat these steps with the interval being the sub-interval that contains the encoded value. When video decoder 300 repeats these steps for the next bin, video decoder 300 may use modified probabilities based on the probabilities indicated by the identified coding context and the decoded bins. Video decoder 300 may then de-binarize the bins to recover the value of the syntax element.

In some instances, video encoder 200 may encode bins using bypass CABAC coding. It may be computationally less expensive to perform bypass CABAC coding on a bin than to perform regular CABAC coding on the bin. Furthermore, performing bypass CABAC coding may allow for a higher degree of parallelization and throughput. Bins encoded using bypass CABAC coding may be referred to as "bypass bins." Grouping bypass bins together may increase the throughput of video encoder 200 and video decoder 300. The bypass CABAC coding engine may be able to code several bins in a single cycle, whereas the regular CABAC coding engine may be able to code only a single bin in a cycle. The bypass CABAC coding engine may be simpler because the bypass CABAC coding engine does not select contexts and may assume a probability of ½ for both symbols (0 and 1). Consequently, in bypass CABAC coding, the intervals are split directly in half.

In accordance with some techniques of this disclosure, a video coder (e.g., video encoder 200 or video decoder 300) may code a first syntax element (e.g., sps_cclm_enabled_flag) that indicates whether all LM modes are disabled for a picture of the video data. CCLM denotes cross-component linear model intra prediction. In this example, the video coder may code a second syntax element (e.g., intra_chroma_pred_mode) that indicates a chroma prediction mode index for a chroma block of the picture. A value of the second syntax element indicates that an intra prediction mode of the chroma block is inherited from a collocated luma block of the picture regardless of whether or not the first syntax element indicates that all LM modes are disabled for the picture. In this example, the video coder may code the chroma block of the picture based on the chroma prediction mode index.

In accordance with some techniques of this disclosure, video encoder 200 may include processing circuitry configured to encode a first syntax element that indicates whether all LM modes are disabled for a picture of the video data, and determine a chroma intra prediction mode for a chroma block of the picture. In addition, the processing circuitry of video encoder 200 may determine a chroma intra prediction index to specify the chroma intra prediction mode for the chroma block. For example, determining the chroma intra prediction mode index may include selecting a particular value to specify that the chroma intra prediction mode for the chroma block is inherited from a collocated luma block. The collocated luma block may be collocated with the chroma block and the particular value is a same value regardless of whether the first syntax element indicates that all LM modes are disabled for the picture. The processing circuitry of video encoder 200 may encode a second syntax element that indicates the chroma prediction mode index for the chroma block of the picture.

Reciprocally, video decoder 300 may include processing circuitry configured to decode a first syntax element that indicates whether all LM modes are disabled for a picture of the video data, and decode a second syntax element that indicates a chroma prediction mode index for a chroma block of the picture. The processing circuitry of video decoder 300 may determine a chroma intra prediction mode for the chroma block based on the chroma intra prediction index. Determining the chroma intra prediction mode for the chroma block may include determining, based on a chroma prediction mode index for the chroma block being equal to a particular value, that the chroma intra prediction mode for the chroma block is inherited from a collocated luma block. The collocated luma block refers to that which is collocated with the chroma block and the particular value is a same value regardless of whether the first syntax element indicates that all LM modes are disabled for the picture. The processing circuitry of video decoder 300 may decode the chroma block based on the chroma intra prediction mode for the chroma block, such as by using the chroma intra prediction mode to generate predictive data, and either using the predictive data as the chroma block or adding residual values to the predictive data to define the chroma block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
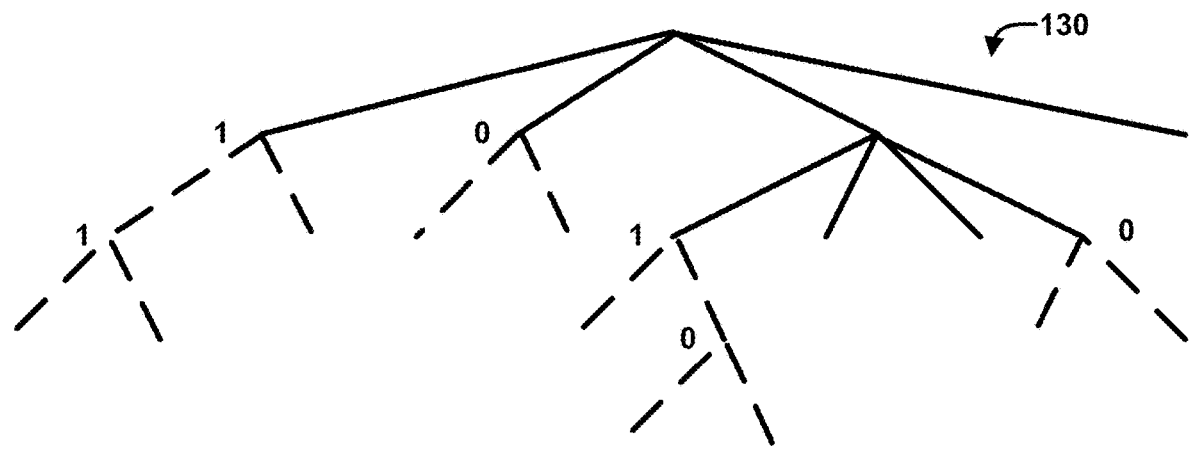
FIGS. 2A and 2B are conceptual diagrams illustrating an example quadtree binary tree (QTBT) structure, and a corresponding coding tree unit (CTU).
Figure 2B:
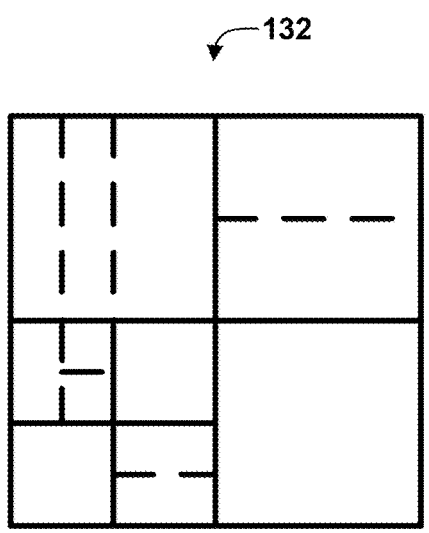

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level (i.e., the first level) of QTBT structure 130 (i.e., the solid lines) and syntax elements (such as splitting information) for a prediction tree level (i.e., the second level) of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, it will not be further split by the binary tree, since the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies that no further vertical splitting is permitted. Similarly, a binary tree node having a height equal to MinBTSize that implies no further horizontal splitting is permitted for that binary tree node. As noted above, leaf nodes of the binary tree are referred to as CUs, and are further processed according to prediction and transform without further partitioning.

Figure 3:
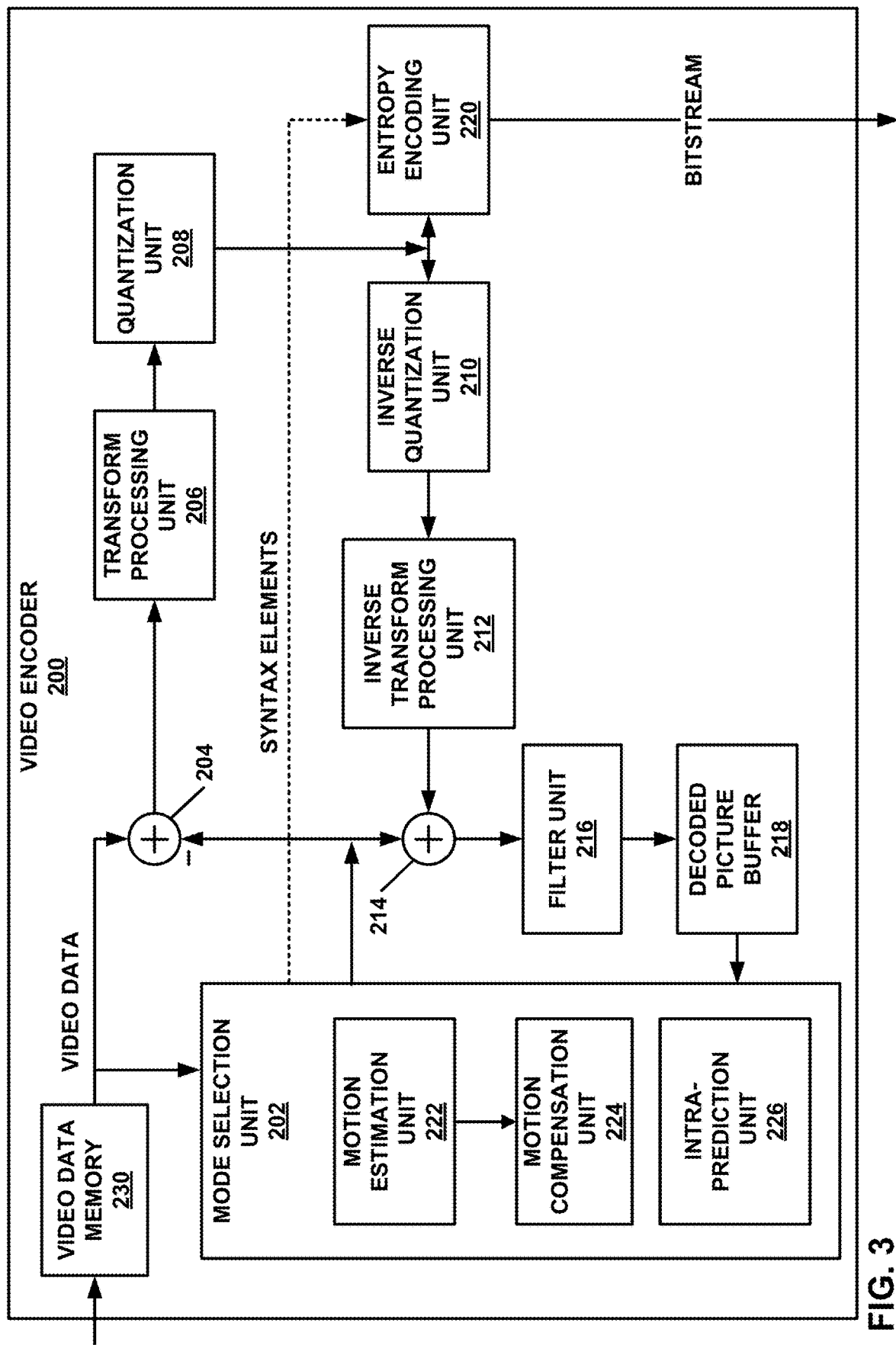
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the H.266 video coding standard in development. However, the techniques of this disclosure are not limited to these video coding standards and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional intra prediction modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and may instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 may calculate sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to encode a first syntax element (e.g., sps_cclm_enabled_flag) that indicates whether all LM modes are disabled for a picture of the video data. In this example, the one or more processing units of video encoder 200 may encode a second syntax element (e.g., intra_chroma_pred_mode) that indicates a chroma prediction mode index for a chroma block of the picture. A value of the second syntax element indicates that an intra prediction mode of the chroma block is inherited from a collocated luma block of the picture regardless of whether or not the first syntax element indicates that all LM modes are disabled for the picture. In this example, the one or more processing units of video encoder 200 may encode the chroma block of the picture based on the chroma prediction mode index. For instance, to encode the chroma block based on the chroma prediction mode index, video encoder 200 may generate a prediction block for the chroma block using a chroma prediction mode and generating the chroma prediction mode index to indicate the chroma prediction mode. Video encoder 200 may use the prediction block to generate residual data, as described elsewhere in this disclosure.

Video encoder 200 further represents one example of a video encoding device comprising a memory 230 configured to store video data, processing circuitry (e.g., mode selection unit 226 implemented by one or more processors) configured to encode a first syntax element that indicates whether all LM modes are disabled for a picture of the video data, determine a chroma intra prediction mode for a chroma block of the picture, determine a chroma intra prediction index to specify the chroma intra prediction mode for the chroma block, wherein determining the chroma intra prediction mode index includes selecting a particular value to specify that the chroma intra prediction mode for the chroma block is inherited from a collocated luma block, wherein the collocated luma block is collocated with the chroma block and the particular value is a same value regardless of whether the first syntax element indicates that all LM modes are disabled for the picture, and encode a second syntax element that indicates the chroma prediction mode index for the chroma block of the picture. The processing circuitry may further implement entropy encoding unit 220, which may be configured to encode the second syntax element using a binarization table that is a same binarization table regardless of whether or not the first syntax element indicates that all LM modes are disabled for the picture. In various examples, the binarization table may specify different fixed length codes for different chroma prediction mode indexes, specify variable length codes for at least some chroma prediction mode indexes, and/or specify Golomb codes for different chroma prediction mode indexes.

Figure 4:
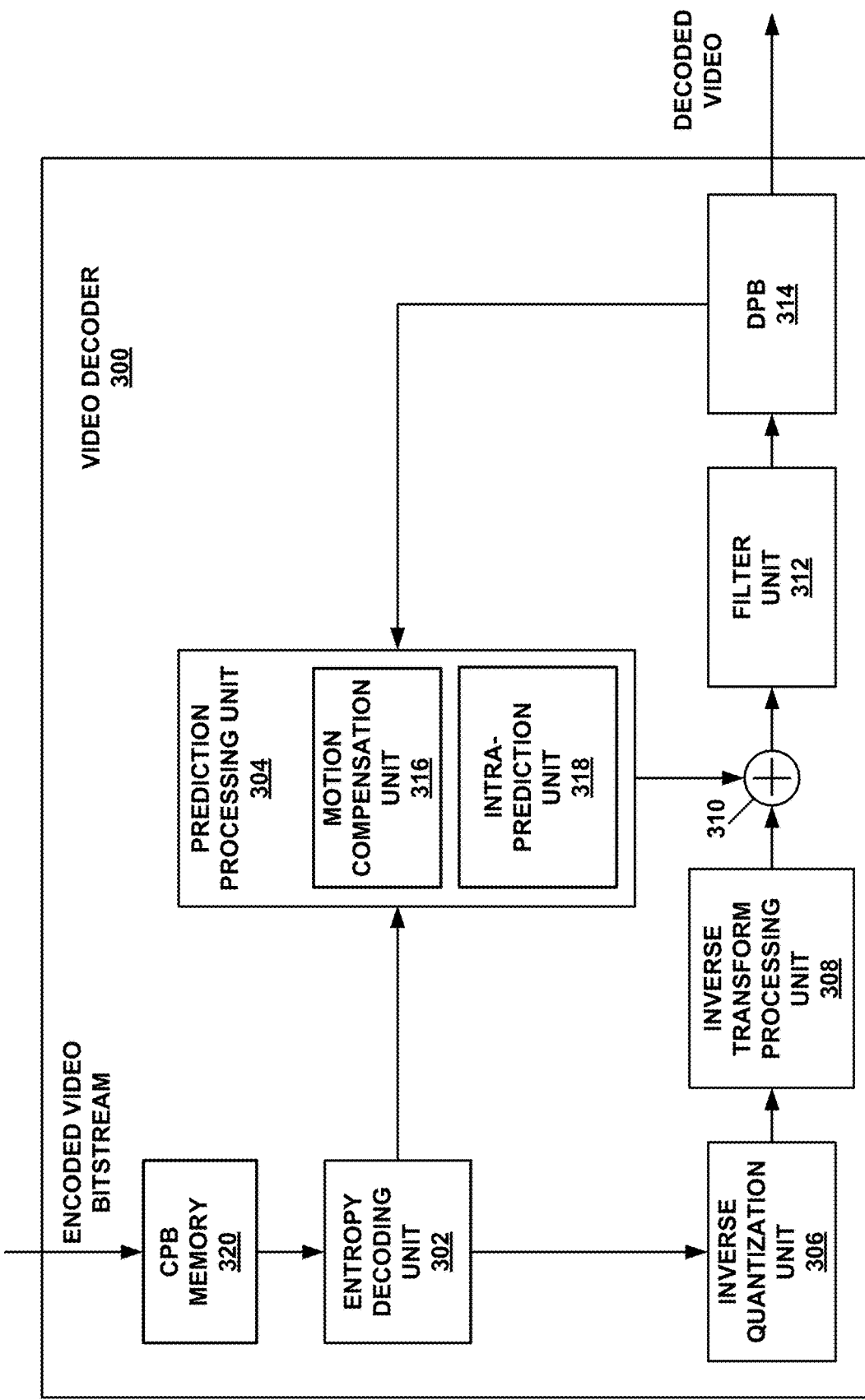
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

Video decoder 300 represents an example of a video decoding device including a memory configured to store video data, and one or more processing units implemented in circuitry and configured to decode a first syntax element (e.g., sps_cclm_enabled_flag) that indicates whether all LM modes are disabled for a picture of the video data. In this example, the one or more processing units of video decoder 300 may decode a second syntax element (e.g., intra_chroma_pred_mode) that indicates a chroma prediction mode index for a chroma block of the picture. A value of the second syntax element indicates that an intra prediction mode of the chroma block is inherited from a collocated luma block of the picture regardless of whether or not the first syntax element indicates that all LM modes are disabled for the picture. In this example, the one or more processing units of video decoder 300 may decode the chroma block of the picture based on the chroma prediction mode index. For instance, to decode the chroma block based on the chroma prediction mode index, video decoder 300 may use the chroma prediction mode index to determine a chroma prediction mode for the chroma block. Video decoder 300 may then generate a prediction block for the chroma block using the chroma prediction mode. Video decoder 300 may use the prediction block and residual data to reconstruct the chroma block, as described elsewhere in this disclosure.

In some examples, video decoder 300 may also represent video decoding device comprising a memory (e.g., CPB memory 320) configured to store video data, and processing circuitry (e.g., intra prediction unit 318) implemented by one or more processors) configured to decode a first syntax element that indicates whether all LM modes are disabled for a picture of the video data, decode a second syntax element that indicates a chroma prediction mode index for a chroma block of the picture, and determine a chroma intra prediction mode for the chroma block based on the chroma intra prediction index. Determining the chroma intra prediction mode for the chroma block may include determining, based on a chroma prediction mode index for the chroma block being equal to a particular value, that the chroma intra prediction mode for the chroma block is inherited from a collocated luma block. The collocated luma block may be collocated with the chroma block and the particular value is a same value regardless of whether the first syntax element indicates that all LM modes are disabled for the picture. Video decoder 300 may decode the chroma block based on the chroma intra prediction mode for the chroma block.

The processing circuitry may further implement entropy decoding unit 302, which may decode the second syntax element using a binarization table that is a same binarization table regardless of whether or not the first syntax element indicates that all LM modes are disabled for the picture. Again, the binarization table may specify different fixed length codes for different chroma prediction mode indexes, specify variable length codes for at least some chroma prediction mode indexes, and/or specify Golomb codes for different chroma prediction mode indexes.

Figure 5:
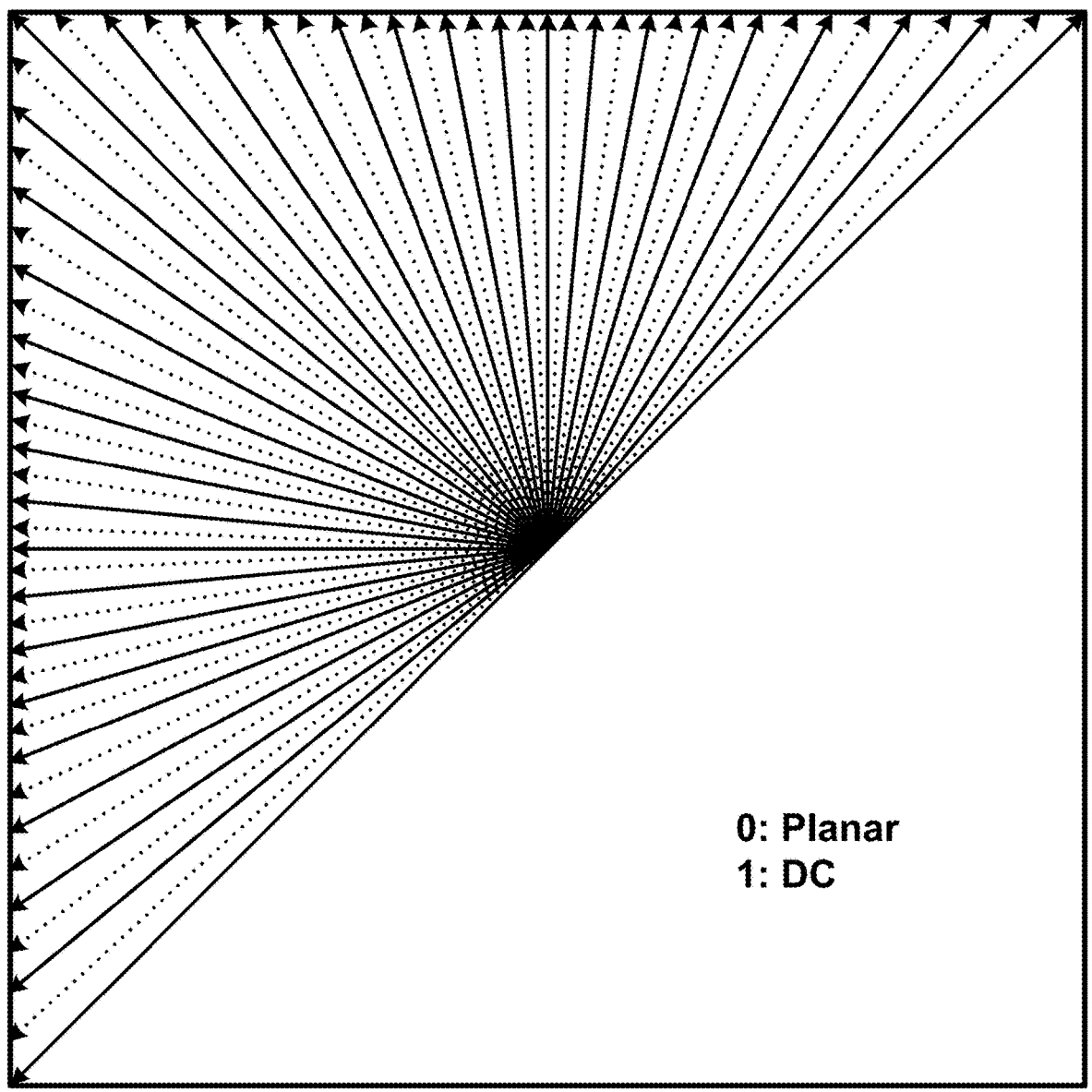
FIG. 5 is a conceptual diagram illustrating example regular intra prediction modes.

To capture the arbitrary edge directions presented in natural video, the number of directional intra modes in VTM5 is extended from 33, as used in HEVC, to 65. FIG. 5 is a conceptual diagram illustrating example regular intra prediction modes. Specifically, FIG. 5 is a conceptual diagram illustrating regular intra prediction modes in VTM5. The directional modes that are in VTM5 that are not in HEVC are depicted as dotted arrows in FIG. 5, and the planar and DC modes remain the same. These denser directional intra prediction modes apply for all block sizes and for both luma and chroma intra predictions.

In addition to traditional (hereafter referred to as "regular" chroma mode) intra prediction, consisting of directional, DC and planar prediction modes, in 4:2:0 chroma video coding, a method called Linear Model (LM) mode has been introduced. See J. Chen, V. Seregin, W.-J. Han, J.-S. Kim, B.-M. Joen, "CE6.a.4: Chroma intra prediction by reconstructed luma samples", Joint Collaborative Team on Video Coding (JCT-VC) of ITU-T SG16 WP3 and ISO/IEC JTC1/SC29/WG11, JCTVC-E266, Geneva, 16-23 Mar. 2011. In LM mode, a video coder (e.g., video encoder 200 or video decoder 300) predicts chroma samples based on the reconstructed luma samples of the same block by using a linear model as follows:

$$\text{pred}_C(i,j) = \alpha \cdot \text{rec}_L(i,j) + \beta \quad (3)$$

where $\text{pred}_C(i,j)$ represents the prediction of chroma samples in a block and $\text{rec}_L(i,j)$ represents the down-sampled reconstructed luma samples of the same block. The video coder may derive parameters α and β by minimizing regression error between the neighboring reconstructed luma and chroma samples around the current block.

$$E(\alpha, \beta) = \sum_i (y_i - (\alpha \cdot x_i + \beta))^2 \quad (4)$$

Figure 6:
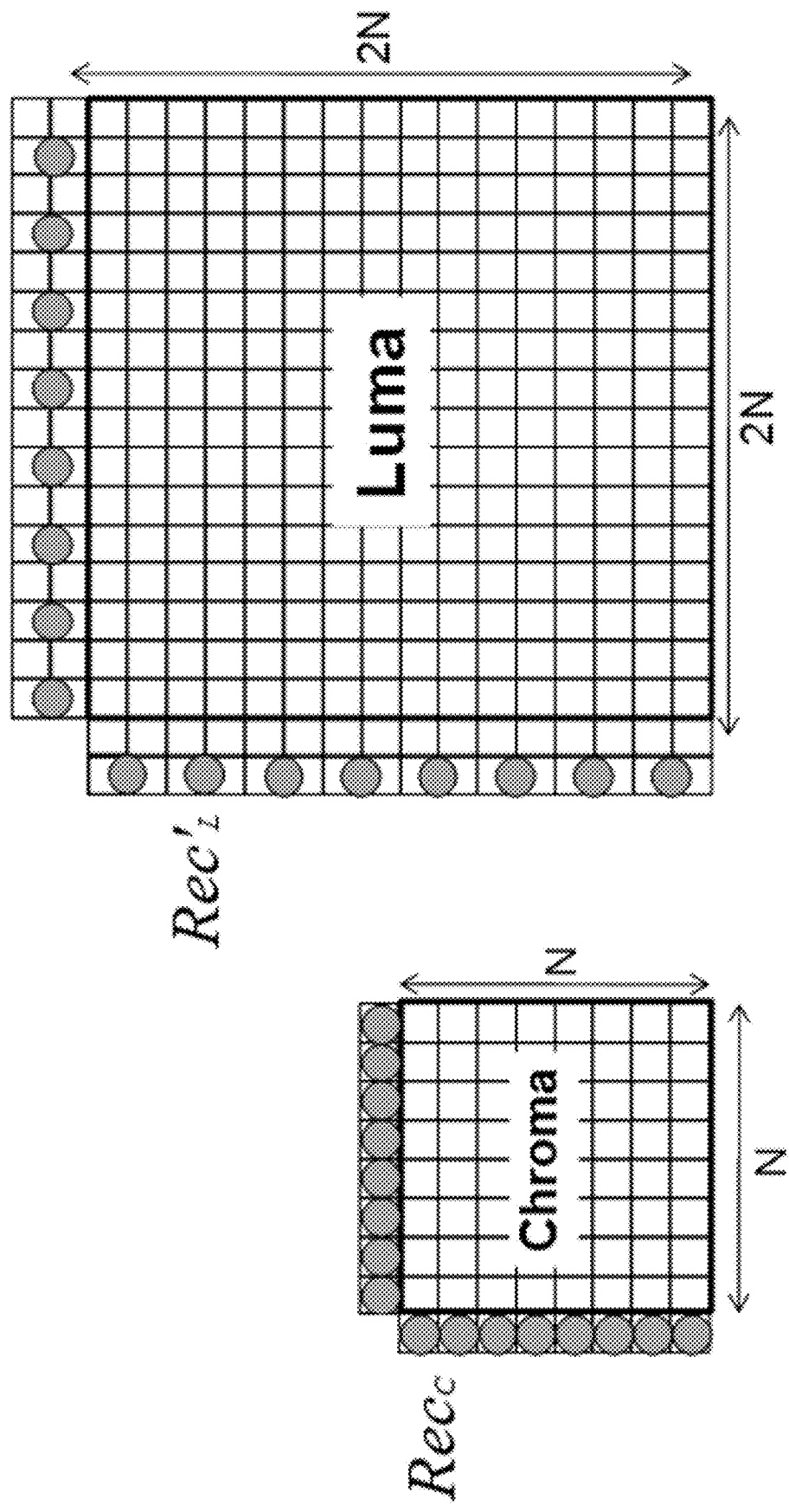
FIG. 6 is a conceptual diagram illustrating sample locations for deriving parameters related to Linear Model (LM) prediction modes.

The parameters α and β are solved as follows:

$$\alpha = \frac{N \sum x_i \cdot y_i - \sum x_i \cdot \sum y_i}{N \sum x_i \cdot x_i - \sum x_i \cdot \sum x_i} \quad (5)$$

$$\beta = \left(\sum y_i - \alpha \cdot \sum x_i\right)/N \quad (6)$$

where $x_i$ are downsampled reconstructed luma reference samples, $y_i$ are reconstructed chroma reference samples, and N is the number of reference samples used. FIG. 6 is a conceptual diagram illustrating sample locations for deriving parameters related to Linear Model (LM) modes.

In VTM5, both regular and LM modes can be used for intra prediction for chroma components. The five regular chroma modes are DC (intra prediction mode 1), Planar (intra prediction mode 0), Vertical (intra prediction mode 50), Horizontal (intra prediction mode 18) and derived (referred to as DM_CHROMA, indicating chroma intra prediction mode is derived from luma i.e., chroma and luma share the same intra prediction mode). When a video coder (e.g., video encoder 200 or video decoder 300) uses DM_CHROMA for intra prediction of a chroma block, the video coder generates a prediction block for the chroma block using an intra prediction mode having the same intra prediction mode index as a luma block corresponding to the chroma block. In other words, the chroma block may inherit the intra prediction mode of collocated luma component. There are three kinds of LM modes depending on the samples used for deriving the associated parameters: 1) LM_CHROMA: using the samples from both above and left template, 2) LM_A: using the samples from only above template, and 3) LM_L: using the samples from only left template. There are therefore a total of eight chroma prediction modes, consisting of 5 regular and 3 LM modes. The derivation of a chroma prediction mode depending on the corresponding luma block is shown below:

TABLE 1

The chroma intra prediction mode depending on the mode index (0-7) and luma prediction mode.

| Chroma prediction mode index | Corresponding luma intra prediction mode | | | | |
|---|---|---|---|---|---|
| | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 0 | 50 | 18 | 1 | X |

For example, in Table 1, if the corresponding luma intra prediction mode is 0 and the chroma prediction mode index is 1, the chroma intra prediction mode is 50. If the chroma prediction mode index is 7, the chroma intra prediction mode is the same as the corresponding luma intra prediction mode. Table 1 generally shows chroma intra prediction modes that are defined based on a chroma prediction mode index (shown in left-most column of Table 1) and corresponding luma intra prediction mode (shown in the top-most row of numbers in Table 1).

In this example, Mode 81: LM_CHROMA, Mode 82: LM_A, Mode 83: LM_L. A chroma prediction mode index equal to 7 indicates DM_CHROMA. Chroma prediction mode index 0, 1, 2 and 3 respectively indicates planar (mode 0), vertical (mode 50), horizontal (mode 18) and DC (mode 1), unless the luma intra prediction mode coincides with the indicated chroma intra prediction mode (in later case, the mode is modified to 66). This is because chroma intra prediction mode index 7 already incorporates the case where luma and chroma modes are the same. Accordingly, for chroma prediction mode index 0 (indicating planar mode), when the luma intra prediction mode is 0 (planar), the chroma mode is modified to 66 in order to remove redundancy. The same is also applicable accordingly to chroma intra prediction mode index 1, 2 and 3.

VTM5 provides functionality to disable all the LM modes on a framewise basis. Specifically, in VVC Draft 5, a high layer (e.g., SPS) flag "sps_cclm_enabled_flag" may be signaled. When the high layer flag is equal to 0, LM modes are excluded, thus the number of chroma prediction modes is 5 (only consisting of regular modes). When the high layer flag is equal to 1, the LM modes are not excluded. Thus, the number of chroma prediction modes is equal to 8. When the LM modes are excluded, blocks may not be encoded using any of the LM modes.

TABLE 2

The chroma prediction mode depending on the chroma prediction mode index (0-4) and luma intra prediction mode when cclm is disabled. Mode index 4 indicates DM_CHROMA

| | Corresponding luma intra prediction mode | | | | |
|---|---|---|---|---|---|
| Chroma prediction mode | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

Due to the different number of intra prediction modes depending on whether sps_cclm_enabled is 0 or not, the VTM5 specification describes two different binarization tables, which are shown below as Table 3 and Table 4. The binarization tables, for example, may be used to encode values using bin strings according to a context adaptive binary arithmetic coding scheme. Upon determining an intra chroma prediction mode (which may be referred to as intra_chroma_pred_mode) based on an index (which may be a chroma prediction mode index) a binarization table such as Table 3 may be used for binarizaiton of the intra chroma prediction mode

TABLE 3

Binarization for intra_chroma_pred_mode when sps_cclm_enabled_flag is equal to 0

| Value of intra_chroma_pred_mode | Bin string |
|---|---|
| 4 | 0 |
| 0 | 100 |
| 1 | 101 |
| 2 | 110 |
| 3 | 111 |

TABLE 4

Binarization for intra_chroma_pred_mode when sps_cclm_enabled_flag is equal to 1

| Value of intra_chroma_pred_mode | Bin string |
|---|---|
| 7 | 0 |
| 4 | 10 |
| 5 | 1110 |
| 6 | 1111 |
| 0 | 11000 |
| 1 | 11001 |
| 2 | 11010 |
| 3 | 11011 |

There are a number of issues with the scheme for intra chroma prediction mode coding in VVC Draft 5 and VTM5. In this disclosure, the phrases intra chroma prediction mode and chroma prediction mode are sometimes used synonymously when referring to intra coding techniques. For example, DM_CHROMA mode has a chroma prediction mode index (e.g., intra_chroma_pred_mode) value of 7 when sps_cclm_enabled_flag is 1, and has a chroma prediction mode index value of 4 when sps_cclm_enabled_flag is 0, which is not consistent. Furthermore, two different binarization tables are needed in the specification text for the chroma prediction mode index, which may be inconvenient, may add complexity to the video coder, and/or may consume storage resources.

The techniques of this disclosure may address these issues. The techniques of this disclosure may be applied independently, or one or more of the techniques may be applicable together.

According VVC Draft 5 and VTM5, LM modes can be used for encoding and decoding chroma blocks. Moreover, according to some test models of VVC, a syntax element may be used to indicate whether all LM modes are disabled for a picture of the video data. According to these test models, if LM modes are disabled, then a first set of indexes is used to identify a chroma intra prediction coding mode used for a block, but if LM modes are enabled, then a second set of indexes (different than the first set) may be used. Moreover, two different binarization tables (e.g., tables 3 and 4) may be used to handle these two situations.

The use of two different sets of indexes for identifying intra coding modes and the two different binarization tables are both problems that may result from such test models of VVC that use a syntax element to indicate whether all LM modes are disabled for a picture of the video data, which can cause complexity in the encoding and decoding process and may require additional memory to store the two binarization tables. The techniques of this disclosure may address these problems by defining a common set of indexes that can be used for intra mode identification, thereby eliminating two different sets of indexes that may otherwise be needed when LM modes are enabled and when LM modes are disabled. Furthermore, the techniques of this disclosure may address these problems defining a common binarization table that can be used for all situations associated with intra coding mode signaling, thereby reducing the number of binarization tables from two to one, which can reduce the amount of memory needed in an encoder and a decoder for the encoding and decoding processes.

By eliminating two binarization tables and replacing them with one unified binarization table, chroma intra prediction mode indexes can be made consistent for situations when LM modes are enabled relative to situations when LM modes are disabled. In some examples, such simplifications and memory reduction advantages can be realized without any negative impact on compression and without any negative impact on encoding and coding efficiency.

For the consistency in specification texts, the techniques of this disclosure may use a same value of intra_chroma_pred_mode for DM_CHROMA (for example, 4) for both sps_cclm_enabled_flag is 0 or 1. The resulting chroma prediction mode table can be as follows:

TABLE 5

Modified chroma prediction mode table with consistent
intra_chroma_pred_mode=4 for both sps_cclm_enabled_flag 0 or 1.

| | Corresponding luma intra prediction mode | | | | |
|---|---|---|---|---|---|
| Chroma prediction mode | 0 | 50 | 18 | 1 | X (0 <= X <= 66) |
| 0 (Planar) | 66 | 0 | 0 | 0 | 0 |
| 1 (Vertical) | 50 | 66 | 50 | 50 | 50 |
| 2 (Horizontal) | 18 | 18 | 66 | 18 | 18 |
| 3 (DC) | 1 | 1 | 1 | 66 | 1 |
| 4 (DM_CHROMA) | 0 | 50 | 18 | 1 | X |
| 5 (LM_CHROMA) | 81 | 81 | 81 | 81 | 81 |
| 6 (LM_L) | 82 | 82 | 82 | 82 | 82 |
| 7 (LM_A) | 83 | 83 | 83 | 83 | 83 |

In Table 5, the value of 4 indicates that the intra prediction mode of the luma block is inherited by the chroma block, regardless of whether the LM modes are enabled. This is different than tables 3 and 4 whose use depends upon whether the LM modes are enabled, where different values of 4 or 7 would indicate inheritance depending on whether the LM modes are enabled.

Techniques of this disclosure may avoid specifying two binarization tables for intra_chroma_pred_mode. Instead, this disclosure proposes a unified binarization table that can be used (e.g., by video encoder 200 and video decoder 300) for both sps_cclm_enabled_flag 0 and 1 cases. For example, regardless of the value of sps_cclm_enabled_flag, the value of intra_chroma_pred_mode can be used to define a bin string according to a unified binarization table, such as table 3, table 4 or table 6, table 7 or table 8 below.

TABLE 6 unified binarization table (option 1)

| Value of intra_chroma_pred_mode | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

Figure 7:
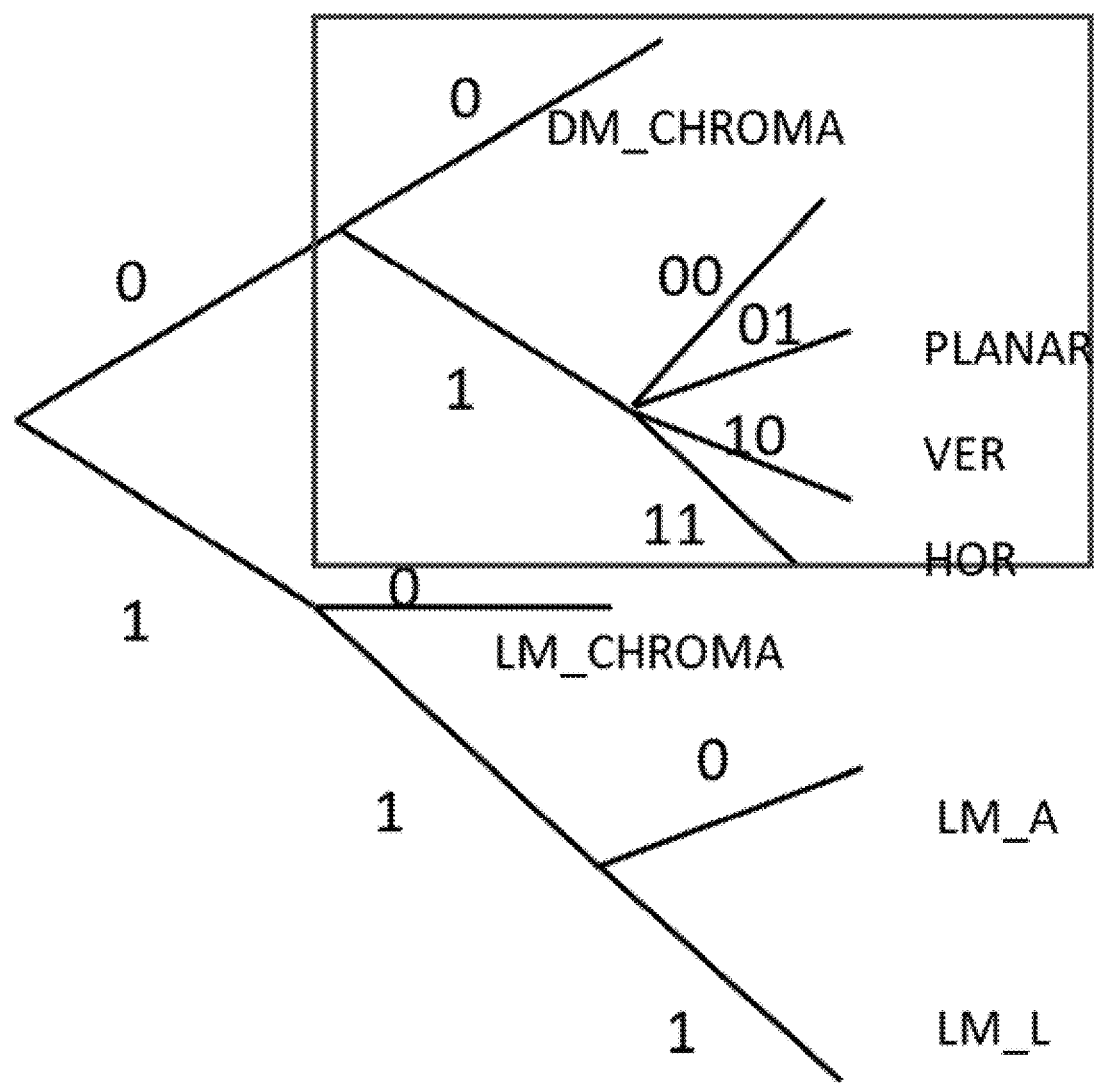
FIG. 7 is a signal tree for chroma coding in which the rectangular part indicates the branching when sps_cclm_enabled_flag is equal to 0, which is a branch of the signaling tree, in accordance with one or more techniques of this disclosure.

FIG. 7 is a signal tree for chroma coding in which the rectangular part indicates the branching when sps_cclm_enabled_flag is equal to 0, which is a branch of the signaling tree, in accordance with one or more techniques of this disclosure. Here, the first bin indicates whether the chroma prediction mode is one of the regular modes (0) or one of the LM modes (1). If the first bin indicates that the chroma prediction mode is a regular mode, then the video coder (e.g., video encoder 200 or video decoder 300) derives the next bins the same way as described in Table 3. If the first bin indicates that the chroma prediction mode is one of the LM modes (i.e., the first bin is equal to 1, then the next bin (i.e., the second bin) indicates whether the chroma prediction mode is LM_CHROMA (i.e., the second bin is equal to 0) or not. If the chroma prediction mode is not LM_CHROMA (i.e., the second bin is equal to 1), the next bin (i.e., the third bin) indicates whether the chroma prediction mode is LM_L (i.e., the third bin is equal to 0) or LM_A (i.e., the third bin is equal to 1). For the case when sps_cclm_enabled_flag is 0, the video coder may discard the first bin of the binarization table for the corresponding intra_chroma_pred_mode prior to the entropy coding. For instance, when sps_cclm_enabled_flag is equal to 0, video encoder 200 does not include bin 0 in binarization of intra_chroma_pred_mode and video decoder 300 interprets the first-occurring bin of the binarization of intra_chroma_pred_mode as bin 1. In other words, the first bin (i.e., bin 0) is inferred to be 0 and hence not to be coded. Accordingly, video decoder 300 may decode the bin string for the second syntax element. To decode the bin string for the second syntax element, video decoder 300 may infer a first portion of the bin string associated with a chroma prediction mode used to decode the chroma block of the picture based on the value of the first syntax element, and determine a second portion of the bin string associated with the chroma prediction mode used to decode the chroma block of the picture based on the value of the second syntax element.

In another example, video encoder 200 or video decoder 300 may use a variable length code for 4 regular modes, to provide a preference towards most probable ones among the 4 regular modes, as compared to Table 6. In other words, most probable modes may be assigned shorter bin strings and less probably modes may be assigned longer bin strings, which can improve compression of a picture of frame video data that uses different modes for different blocks within the picture of frame.

TABLE 7 unified binarization table (option 2)

| Value of intra_chroma_pred_mode | Bin string |
|---|---|
| 4 | 00 |
| 0 | 010 |
| 1 | 0110 |
| 2 | 01110 |
| 3 | 01111 |
| 5 | 10 |
| 6 | 110 |
| 7 | 111 |

In another example, video encoder 200 and video decoder 300 may use a different binarization table (e.g., Table 8) while keeping the number of bins for DM_CHROMA to 1 (instead of 2, which is described above in Table 6 and Table 7).

TABLE 8 unified binarization table (option 3)

| Value of intra_chroma_pred_mode | Bin string |
|---|---|
| 4 | 0 |
| 0 | 10 |
| 1 | 110 |
| 2 | 1110 |
| 3 | 11110 |
| 5 | 111110 |
| 6 | 1111110 |
| 7 | 1111111 |

For Table 6, following contexts can be used (all or maybe only a subset can be used) for CABAC coding bin strings for intra_chroma_pred_mode syntax elements.
Context 0: first bin (LM mode or not).
Context 1: second bin corresponding to when first bin=0 (DM_CHROMA or not).

Context 2: second bin corresponding to when first bin=1 (LM_CHROMA or not).
Context 3: third bin corresponding to when second bin=1 (LM_L or LM_A). In some examples, however, contexts 0-2 are used as defined above and the third bin may be bypass coded.

TABLE 9

Context for each binIdx

| Syntax | binIdx = 0 | 1 | 2 | 3 | 4 | >=5 |
|---|---|---|---|---|---|---|
| intra_chroma_pred_mode[ ][ ] sps_cclm_enabled_flag = = 0 | Na | 1 | by-pass | by-pass | na | Na |
| intra_chroma_pred_mode[ ][ ] sps_cclm_enabled_flag = = 1 && bin at binIdx equal to 0 = = 0 | 0 | 1 | by-pass | by-pass | na | Na |
| intra_chroma_pred_mode[ ][ ] sps_cclm_enabled_flag = = 1 && bin at binIdx equal to 0 = = 1 | 0 | 2 | 3 | Na | na | Na |

In table 9, contexts for each binIdx are shown for three different scenarios, which are defined by values of the syntax elements shown in the leftmost column of Table 9.

In another example, to reduce an amount of parsing or context selection dependency, a video coder (e.g., video encoder 200 or video decoder 300) may use the following, where the same contexts (context 1) for binIdx=1 is selected irrespective of binIdx value.
Context 1: first bin (LM mode or regular mode).
Context 2: second bin (LM_CHROMA or not & DM_CHROMA or not).

TABLE 10

| Syntax | binIdx = 0 | 1 | 2 | 3 | 4 | >=5 |
|---|---|---|---|---|---|---|
| intra_chroma_pred_mode[ ][ ] sps_cclm_enabled_flag = = 0 | Na | 1 | by-pass | by-pass | na | na |
| intra_chroma_pred_mode[ ][ ] sps_cclm_enabled_flag = = 1 && bin at binIdx equal to 0 = = 0 | 0 | 1 | by-pass | by-pass | na | na |
| intra_chroma_pred_mode[ ][ ] sps_cclm_enabled_flag = = 1 && bin at binIdx equal to 0 = = 1 | 0 | 1 | by-pass | na | na | na |

The defining of contexts as shown in Table 10, for example, may help to reduce an amount of parsing or context selection dependency that may otherwise exist according to techniques that use different contexts for every possible scenario of values of the syntax elements shown in the leftmost column of Table 10, without reducing or severely affecting coding efficiency.

Figure 8:
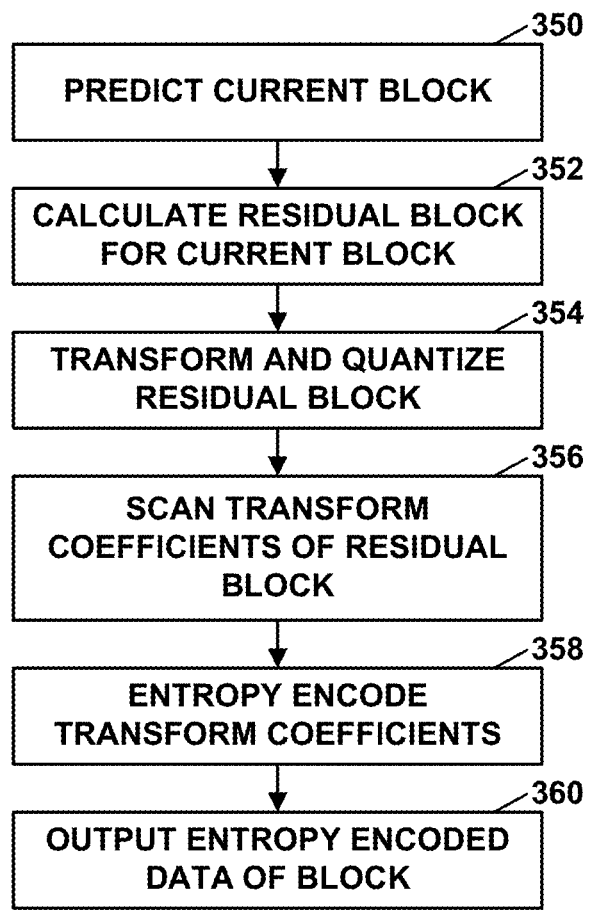
FIG. 8 is a flowchart illustrating an example method for encoding a current block.

For Table 7, the following contexts can be used (in some examples, all the contexts below may be used, and in other examples, only a subset of the contexts may be used). The contexts
Context 0: first bin (LM mode or not).
Context 1: second bin corresponding to when first bin=0 (DM_CHROMA or not).
Context 2: third bin corresponding to when first two bins are 01 (Planar or not).
Context 3: second bin corresponding to when first bin=1 (LM_CHROMA or not).
Context 4: third bin corresponding to when first two bins are 11 (LM_L or LM_A).
FIG. 8 is a flowchart illustrating an example method for encoding a current block. The current block may be a current CU or may include a current CU. Although described with respect to video encoder 200 (FIGS. 1 and 3), it should be understood that other devices may be configured to perform a method similar to that of FIG. 8.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize transform coefficients of the residual block (354). Next, video encoder 200 may scan the quantized transform coefficients of the residual block (356). During the scan, or following the scan, video encoder 200 may entropy encode the transform coefficients (358), as well as an indication of a prediction mode used to form the prediction block. In accordance with the techniques of this disclosure, if the current block is a chroma block and the chroma block is indicated as being encoded using a derived mode (e.g., DM_CHROMA), i.e., that the prediction mode is to be derived, video encoder 200 may encode a value for a syntax element representing the derived mode, where the value is the same regardless of whether linear modes are enabled for a picture including the current block or not. For example, video encoder 200 may encode the transform coefficients using CAVLC or CABAC. Video encoder 200 may then output the entropy encoded data of the block (360).

Consistent with FIG. 8, the step of predicting a current block (350) may include encoding a first syntax element that indicates whether all LM modes are disabled for a picture of the video data, determining a chroma intra prediction mode for a chroma block of the picture, determining a chroma intra prediction index to specify the chroma intra prediction mode for the chroma block. In this example, the chroma block may correspond to the current block referenced in (350) of FIG. 8. Moreover, in this example, determining the chroma intra prediction mode index may include selecting a particular value to specify that the chroma intra prediction mode for the chroma block is inherited from a collocated luma block. Furthermore, in this example, the collocated luma block is collocated with the chroma block and the particular value is a same value regardless of whether the first syntax element indicates that all LM modes are disabled for the picture. The process of entropy encoding (358) may include encoding a second syntax element that indicates the chroma prediction mode index for the chroma block of the picture. Furthermore, the step of entropy encoding transform coefficients (358) may include encoding the second syntax element includes encoding the second syntax element using a binarization table that is a same binarization table regardless of whether or not the first syntax element indicates that all LM modes are disabled for the picture.

Figure 9:
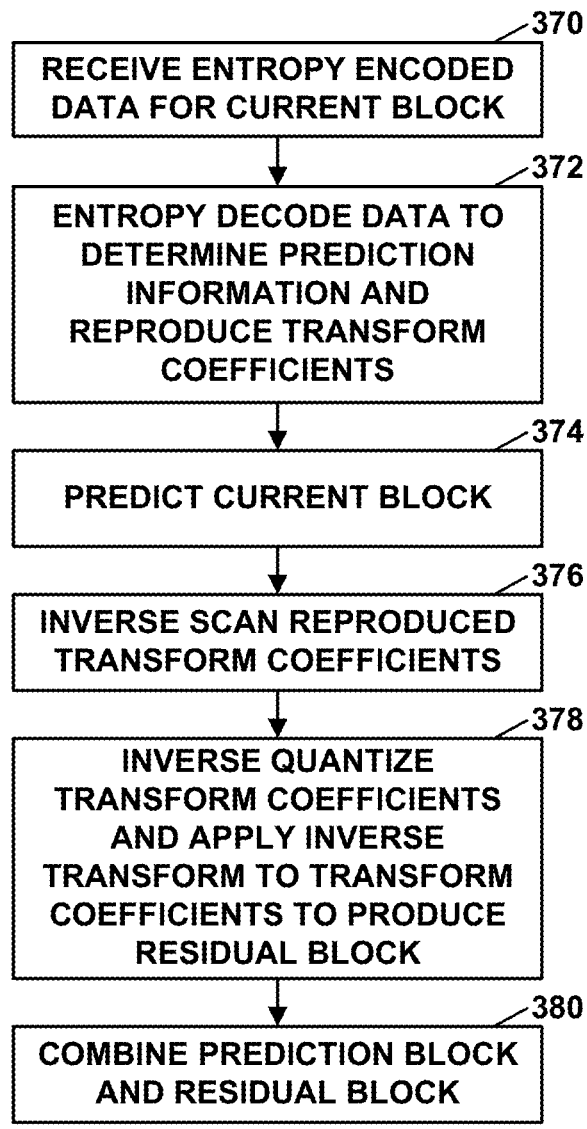
FIG. 9 is a flowchart illustrating an example method for decoding a current block of video data.

FIG. 9 is a flowchart illustrating an example method for decoding a current block of video data. The current block may be a current CU or may include a current CU. Although described with respect to video decoder 300 (FIGS. 1 and 4), it should be understood that other devices may be configured to perform a method similar to that of FIG. 9.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). In accordance with the techniques of this disclosure, video decoder 300 may decode a value for a syntax element representing an intra prediction mode for a chroma block, and the value may be the same regardless of whether linear modes are enabled for a picture including the current block or not. Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize and inverse transform the transform coefficients to produce a residual block (378). Video decoder 300 may ultimately decode the current block by combining the prediction block and the residual block (380).

Consistent with the techniques of this disclosure, the process of predicting a current block (374), when the current block is a chroma block, may include decoding a first syntax element that indicates whether all LM modes are disabled for a picture of the video data. Additionally, the process of entropy decoding the entropy encoded data may include decoding a second syntax element that indicates a chroma prediction mode index for a chroma block of the picture, determining a chroma intra prediction mode for the chroma block based on the chroma intra prediction index. In this example, determining the chroma intra prediction mode for the chroma block may include determining, based on a chroma prediction mode index for the chroma block being equal to a particular value, that the chroma intra prediction mode for the chroma block is inherited from a collocated luma block. Furthermore, in this example, the collocated luma block is collocated with the chroma block and the particular value is a same value regardless of whether the first syntax element indicates that all LM modes are disabled for the picture. Furthermore, video decoder 300 may decode the chroma block based on the chroma intra prediction mode for the chroma block. For instance, video decoder 300 may decode the chroma block by generating predictive data based on the chroma intra prediction mode, such as by adding residual values to the predictive data to create a decoded block or by merely using the predictive data as the decoded block. Furthermore, the step of entropy decoding data (372) may include using a binarization table that is a same binarization table regardless of whether or not the first syntax element indicates that all LM modes are disabled for the picture.

Figure 10:
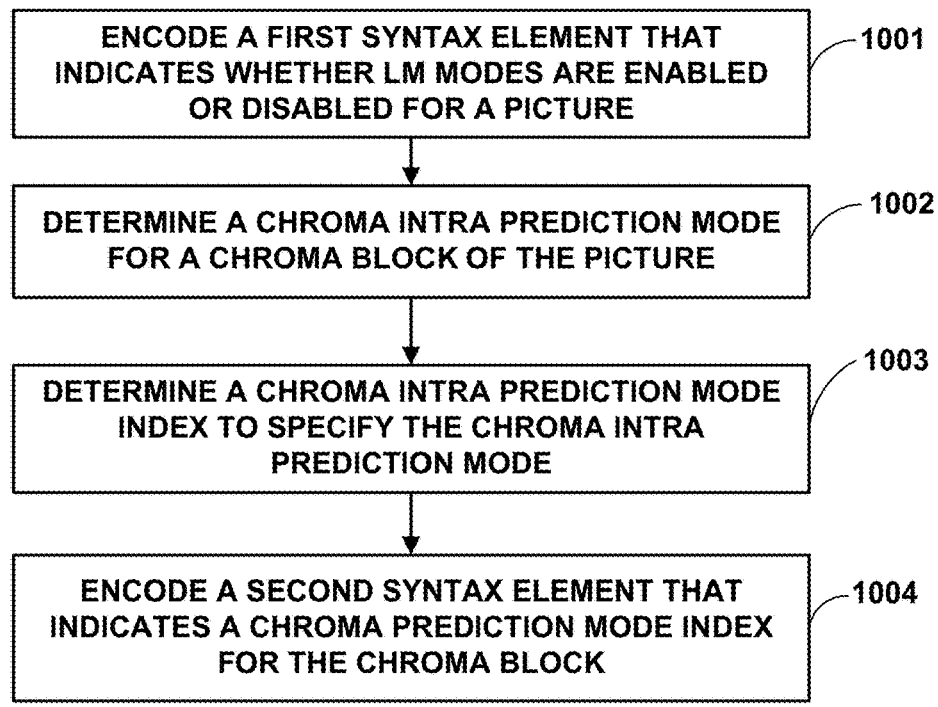
FIG. 10 is a flowchart illustrating an example encoding method consistent with this disclosure.

FIG. 10 is a flowchart illustrating an example encoding method consistent with this disclosure. FIG. 10 will be described from the perspective of video encoder 200 although other encoders may use the encoding methods of this disclosure. As shown in the example of FIG. 10, video encoder 200 may encode a first syntax element (e.g., sps_cclm_enabled_flag) that indicates whether all LM modes are disabled for a picture of the video data (1001). For example, to encode the first syntax element, video encoder 200 may include an unsigned integer representing the first syntax element in a bitstream the includes an encoded representation of the video data.

Video encoder 200 may also determine a chroma intra prediction mode for a chroma block of the picture (1002). For instance, video encoder 200 may compare results of encoding the chroma block using a plurality of different chroma intra prediction modes and determine the chroma intra prediction based on this comparison.

In addition, video encoder 200 may determine a chroma intra prediction index to specify the chroma intra prediction mode for the chroma block (1003). Moreover, determining the chroma intra prediction index the chroma intra prediction mode index may include selecting a particular value to specify that the chroma intra prediction mode for the chroma block is inherited from a collocated luma block. In the example of FIG. 10, the collocated luma block is collocated with the chroma block and the particular value is the same value regardless of whether the first syntax element indicates that all LM modes are disabled for the picture.

Video encoder 200 may then encode a second syntax element that indicates the chroma prediction mode index for the chroma block of the picture (1004). As described herein, encoding the second syntax element (1004) may include encoding the second syntax element using a binarization table that is a same binarization table regardless of whether or not the first syntax element indicates that all LM modes are disabled for the picture. In other words, video encoder 200 may use the binarization table to look up a bin string that corresponds to the chroma prediction mode index. After using the binarization table to look up the bin string that corresponds to the chroma prediction mode index, video encoder 200 may apply CABAC encoding to the bin string and include the resulting CABAC encoded bin string in the bitstream. In different examples, the binarization table may specify different fixed length codes for different chroma prediction mode indexes, specify variable length codes for at least some chroma prediction mode indexes, and/or specify Golomb codes for different chroma prediction mode indexes. The chroma prediction mode index defines a chroma prediction mode from a group of modes consisting of: mode index 0—planar mode; mode index 1—vertical mode; mode index 2—horizontal mode; mode index 3—DC mode; mode index 4—DM_Chroma mode; mode index 5—LM_Chroma mode; mode index 6—LM_L mode; and mode index 7—LM_A mode.

In some examples, using the binarization table may include encoding a bin string for the second syntax element based on the chroma prediction mode index using the binarization table, which may correspond to Table 6, Table 7, or Table 8 above.

As noted above, in some examples, encoding the second syntax element (e.g., intra_chroma_pred_mode) may include using a binarization table and using the binarization table may include using the binarization table to determine a bin string based on the chroma prediction mode index. In some such examples, video encoder 200 may exclude, from encoded video data, a first portion (e.g., bin 0) of the bin string associated with a chroma prediction mode used to encode the chroma block of the picture. However, in such examples, the first portion is inferable (e.g., by video decoder 300) based on the value of the first syntax element (e.g., sps_cclm_enabled_flag). In such examples, video decoder 300 may include, in the encoded video data, a second portion of the bin string (e.g., bins 1-3) associated with the chroma prediction mode used to encode the chroma block of the picture.

In some examples, encoding the second syntax element (e.g., intra_chroma_pred_mode) may include using the binarization table to determine a bin string based on the chroma prediction mode index, and applying a CABAC technique to encode the bin string for the second syntax element. To apply the CABAC technique to encode the bin string video encoder 200 may, based on the first syntax element indicating that all LM modes are disabled for the picture: use a first context to encode a first-occurring bin of the bin string and use a second context to encode a second-occurring bin of the bin string depending on a value of the first bin of the bin string. In this example, the first and second contexts are different from each other. The second-occurring bin indicates whether or not the chroma intra prediction mode for the chroma block is inherited from a collocated luma block.

Figure 11:
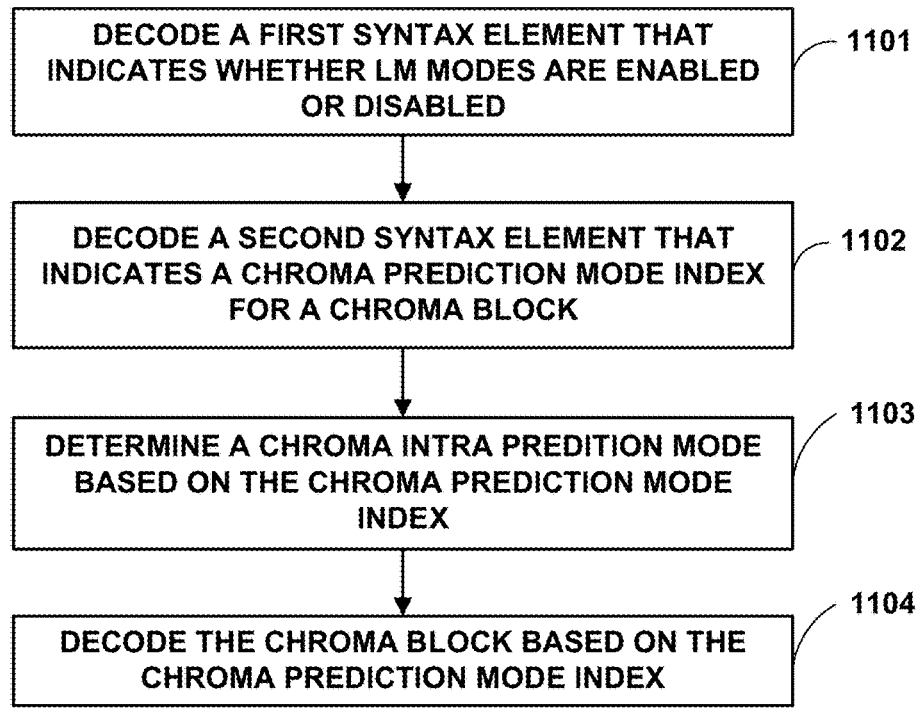
FIG. 11 is a flowchart illustrating an example decoding method consistent with this disclosure.

FIG. 11 is a flowchart illustrating an example decoding method consistent with this disclosure. FIG. 11 will be described from the perspective of video encoder 300 although other decoders may use the decoding methods of this disclosure. As shown in the example of FIG. 11, video decoder 300 decodes a first syntax element (e.g., sps_ccl-m_enabled_flag) that indicates whether all LM modes are disabled for a picture of the video data (1101). For instance, to decode the first syntax element, video decoder 300 may parse an unsigned integer value representing the first syntax element from the bitstream.

Additionally, video decoder 300 decodes a second syntax element (e.g., intra_chroma_pred_mode) that indicates a chroma prediction mode index for a chroma block of the picture (1102). Video decoder 300 determines a chroma intra prediction mode for the chroma block based on the chroma intra prediction index for the chroma block (1103). Determining the chroma intra prediction mode for the chroma block may include determining, based on the chroma prediction mode index for the chroma block being equal to a particular value, that the chroma intra prediction mode for the chroma block is inherited from a collocated luma block. The collocated luma block is collocated with the chroma block and the particular value is a same value (e.g., 4 in Table 5 and Table 6) regardless of whether the first syntax element indicates that all LM modes are disabled for the picture.

Furthermore, in the example of FIG. 11, video decoder 300 then decodes the chroma block based on the chroma intra prediction mode for the chroma block (1104). For example, using the chroma intra prediction mode, video decoder 300 may generate predictive data, and either use the predictive data as the decoded block or add residual values to the predictive data to create the decoded block. As described herein, decoding the second syntax element (1102) may include decoding the second syntax element using a binarization table that is a same binarization table regardless of whether or not the first syntax element indicates that all LM modes are disabled for the picture. In other words, video decoder 300 may apply CABAC decoding to a bin string parsed from the bitstream. Video decoder 300 may use the binarization table to look up a chroma prediction mode index that corresponds to the CABAC decoded bin string. As examples, the binarization table may specify different fixed length codes for different chroma prediction mode indexes, specify variable length codes for at least some chroma prediction mode indexes, and/or specify Golomb codes for different chroma prediction mode indexes. The binarization table may correspond to Table 6, Table 7, or Table 8 above. The chroma prediction mode index may define a chroma prediction mode from a group of modes consisting of: mode index 0—planar mode; mode index 1—vertical mode; mode index 2—horizontal mode; mode index 3—DC mode; mode index 4—DM_Chroma mode; mode index 5—LM_Chroma mode; mode index 6—LM_L mode; and mode index 7—LM_A mode.

In some examples, as part of decoding the second syntax element using the binarization table, video decoder 300 may determine a bin string for the second syntax element and use the binarization table to determine the chroma prediction mode index from the bin string. In some such examples, to determine the bin string for the second syntax element, video decoder 300 may infer a first portion of the bin string associated with a chroma prediction mode used to decode the chroma block of the picture based on the value of the first syntax element. On the other hand, based on the value of the first syntax element indicating that all LM modes are enabled, video decoder 300 may determine that the bin string includes the first portion. In either case, video decoder 300 may determine a second portion of the bin string (e.g., bins 1-3) based on the value of the second syntax element.

In some examples, decoding the second syntax element may include video decoder 300 applying a CABAC technique to determine a bin string for the second syntax element and using the binarization table to determine the chroma prediction mode index from the bin string. Applying the CABAC technique to determine the bin string for the second syntax element may include, based on the first syntax element indicating that all LM modes are disabled for the picture: using a first context to decode of a first-occurring bin of the bin string, and using a second context to decode a second-occurring bin of the bin string depending on a value of the first bin of the bin string, wherein the first and second contexts are different from each other, and the second-occurring bin indicates whether or not the chroma intra prediction mode for the chroma block is inherited from a collocated luma block.

Examples—The following examples demonstrate one or more aspects of this disclosure.

Example 1—A method of decoding video data, the method comprising: decoding a first syntax element that indicates whether all linear model (LM) modes are disabled for a picture of the video data; decoding a second syntax element that indicates a chroma prediction mode index for a chroma block of the picture; determining a chroma intra prediction mode for the chroma block based on the chroma intra prediction index, wherein determining the chroma intra prediction mode for the chroma block comprises determining, based on the chroma prediction mode index for the chroma block being equal to a particular value, that the chroma intra prediction mode for the chroma block is inherited from a collocated luma block, wherein the collocated luma block is collocated with the chroma block and the particular value is a same value regardless of whether the first syntax element indicates that all LM modes are disabled for the picture; and decoding the chroma block based on the chroma intra prediction mode for the chroma block.

Example 2—The method of example 1, wherein decoding the second syntax element comprises decoding the second syntax element using a binarization table that is a same binarization table regardless of whether or not the first syntax element indicates that all LM modes are disabled for the picture.

Example 3—The method of any combination of examples 1-2, wherein the binarization table specifies different fixed length codes for different chroma prediction mode indexes.

Example 4—The method of any combination of examples 1-3, wherein the binarization table specifies variable length codes for at least some chroma prediction mode indexes.

Example 5—The method of any combination of examples 1-4, wherein the binarization table specifies Golomb codes for different chroma prediction mode indexes.

Example 6—The method of any combination of examples 1-5, wherein the chroma prediction mode index defines a chroma prediction mode from a group of modes consisting of: mode index 0—planar mode; mode index 1—vertical mode; mode index 2—horizontal mode; mode index 3—DC mode; mode index 4—DM_Chroma mode; mode index 5—LM_Chroma mode; mode index 6—LM_L mode; and mode index 7—LM_A mode.

Example 7—The method of any combination of examples 1-6, wherein using the binarization table comprises: determining a bin string for the second syntax element; and using the binarization table to determine the chroma prediction mode index from the bin string.

Example 8—The method of any combination of examples 1-7, wherein the binarization table comprises:

| Chroma prediction mode index | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

Example 9—The method of any combination of examples 1-8, wherein decoding the second syntax element using the binarization table comprises: determining a bin string for the second syntax element; and using the binarization table to determine the chroma prediction mode index from the bin string, and wherein determining the bin string for the second syntax element comprises: inferring a first portion of the bin string associated with a chroma prediction mode used to decode the chroma block of the picture based on the value of the first syntax element; and determining a second portion of the bin string associated with the chroma prediction mode used to decode the chroma block of the picture based on the value of the second syntax element.

Example 10—The method of any combination of examples 1-9, wherein decoding the second syntax element comprises: applying a context adaptive binary arithmetic coding (CABAC) technique to determine a bin string for the second syntax element; and using the binarization table to determine the chroma prediction mode index from the bin string, wherein applying the CABAC technique to determine the bin string for the second syntax element comprises, based on the first syntax element indicating that all LM modes are disabled for the picture: using a first context to decode of a first-occurring bin of the bin string; and using a second context to decode a second-occurring bin of the bin string depending on a value of the first bin of the bin string, wherein the first and second contexts are different from each other, and the second-occurring bin indicates whether or not the chroma intra prediction mode for the chroma block is inherited from a collocated luma block.

Example 11—A method of encoding video data, the method comprising: encoding a first syntax element that indicates whether all linear model (LM) modes are disabled for a picture of the video data; determining a chroma intra prediction mode for a chroma block of the picture; determining a chroma intra prediction index to specify the chroma intra prediction mode for the chroma block, wherein determining the chroma intra prediction mode index comprises selecting a particular value to specify that the chroma intra prediction mode for the chroma block is inherited from a collocated luma block, wherein the collocated luma block is collocated with the chroma block and the particular value is a same value regardless of whether the first syntax element indicates that all LM modes are disabled for the picture; and encoding a second syntax element that indicates the chroma prediction mode index for the chroma block of the picture.

Example 12—The method of example 11, wherein encoding the second syntax element comprises encoding the second syntax element using a binarization table that is a same binarization table regardless of whether or not the first syntax element indicates that all LM modes are disabled for the picture.

Example 13—The method of any combination of examples 11-12, wherein the binarization table specifies different fixed length codes for different chroma prediction mode indexes.

Example 14—The method of any combination of examples 11-13, wherein the binarization table specifies variable length codes for at least some chroma prediction mode indexes.

Example 15—The method of any combination of examples 11-14, wherein the binarization table specifies Golomb codes for different chroma prediction mode indexes.

Example 16—The method of any combination of examples 11-15, wherein the chroma prediction mode index defines a chroma prediction mode from a group of modes consisting of: mode index 0—planar mode; mode index 1—vertical mode; mode index 2—horizontal mode; mode index 3—DC mode; mode index 4—DM_Chroma mode; mode index 5—LM_Chroma mode; mode index 6—LM_L mode; and mode index 7—LM_A mode.

Example 17—The method of any combination of examples 11-16, wherein using the binarization table comprises: encoding a bin string for the second syntax element based on the chroma prediction mode index using the binarization table.

Example 18—The method of any combination of examples 11-17, wherein the binarization table comprises:

| Chroma prediction mode index | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

Example 19—The method of any combination of examples 11-18, wherein encoding the second syntax element using the binarization table comprises: using the binarization table to determine a bin string based on the chroma prediction mode index, excluding from encoded video data, a first portion of the bin string associated with a chroma prediction mode used to encode the chroma block of the picture, wherein the first portion is inferable based on the value of the first syntax element; and including in the encoded video data a second portion of the bin string associated with the chroma prediction mode used to encode the chroma block of the picture.

Example 20—The method of any combination of examples 11-19, wherein encoding the second syntax element comprises: using the binarization table to determine a bin string based on the chroma prediction mode index; and applying a context adaptive binary arithmetic coding (CABAC) technique to encode the bin string for the second syntax element, wherein applying the CABAC technique to encode the bin string comprises, based on the first syntax element indicating that all LM modes are disabled for the picture: using a first context to encode of a first-occurring bin of the bin string; and using a second context to encode a second-occurring bin of the bin string depending on a value of the first bin of the bin string, wherein the first and second contexts are different from each other, and the second-occurring bin indicates whether or not the chroma intra prediction mode for the chroma block is inherited from a collocated luma block.

Example 21—A video decoding device configured to perform any combination of methods of examples 1-10.

Example 22—A video decoding device comprising means for performing any combination of steps set forth in examples 1-10.

Example 23—A computer-readable storage medium storing instructions that, when executed, cause one or more processors of a video decoding device to perform the method of any combination of examples 1-10.

Example 24—A video encoding device configured to perform any combination of methods of examples 11-20.

Example 25—A video encoding device comprising means for performing any combination of steps set forth in examples 11-20.

Example 26—A computer-readable storage medium storing instructions that, when executed, cause one or more processors of a video encoding device to perform the method of any combination of examples 11-20.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
  decoding a first syntax element that indicates whether all linear model (LM) modes are disabled for a sequence parameter set (SPS) of the video data;
  decoding a second syntax element that indicates a chroma prediction mode index for a chroma block of a picture in a sequence of pictures associated with the SPS of the video data;
  determining a chroma intra prediction mode for the chroma block based on the chroma prediction mode index, wherein determining the chroma intra prediction mode for the chroma block comprises:
    determining, based on the chroma prediction mode index for the chroma block being equal to a particular value, that the chroma intra prediction mode for the chroma block is inherited from a collocated luma block, wherein the collocated luma block is collocated with the chroma block and the particular value is a same value regardless of whether the first syntax element indicates that all the LM modes are disabled for the picture, and
    responsive to the first syntax element indicating all the LM modes are not disabled for the picture, determining that the chroma prediction mode index indicates a cross-component linear model intra prediction mode; and decoding the chroma block based on the chroma intra prediction mode for the chroma block, wherein decoding the second syntax element comprises decoding the second syntax element using a binarization table that is a same binarization table regardless of whether or not the first syntax element indicates that all the LM modes are disabled for the picture.

2. The method of claim 1, wherein the binarization table specifies different fixed length codes for different chroma prediction mode indexes.

3. The method of claim 1, wherein the binarization table specifies variable length codes for at least some chroma prediction mode indexes.

4. The method of claim 1, wherein the binarization table specifies Golomb codes for different chroma prediction mode indexes.

5. The method of claim 1, wherein the chroma prediction mode index defines a chroma prediction mode from a group of chroma prediction modes consisting of:
mode index 0—planar mode;
mode index 1—vertical mode;
mode index 2—horizontal mode;
mode index 3—DC mode;
mode index 4—DM_Chroma mode mode index 5—LM_Chroma mode;
mode index 6—LM_L mode; and
mode index 7—LM_A mode.

6. The method of claim 1, wherein decoding the second syntax element using the binarization table comprises:
determining a bin string for the second syntax element; and
using the binarization table to determine the chroma prediction mode index from the bin string for the second syntax element.

7. The method of claim 6, wherein the binarization table comprises:

| Chroma prediction mode index | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

8. The method of claim 1, wherein decoding the second syntax element using the binarization table comprises:
determining a bin string for the second syntax element; and
using the binarization table to determine the chroma prediction mode index from the bin string for the second syntax element, and
wherein determining the bin string for the second syntax element comprises:
inferring a first portion of the bin string for the second syntax element associated with a chroma prediction mode used to decode the chroma block of the picture based on a value of the first syntax element; and
determining a second portion of the bin string for the second syntax element associated with the chroma prediction mode used to decode the chroma block of the picture based on a value of the second syntax element.

9. The method of claim 1, wherein decoding the second syntax element comprises:
applying a context adaptive binary arithmetic coding (CABAC) technique to determine a bin string for the second syntax element; and
using the binarization table to determine the chroma prediction mode index from the bin string for the second syntax element,
wherein applying the CABAC technique to determine the bin string for the second syntax element comprises, based on the first syntax element indicating that all the LM modes are disabled for the picture;
using a first context to decode of a first-occurring bin of the bin string for the second syntax element; and
using a second context to decode a second-occurring bin of the bin string for the second syntax element depending on a value of the first bin of the bin string for the second syntax element, wherein the first and second contexts are different from each other, and the second-occurring bin indicates whether or not the chroma prediction intra prediction mode for the chroma block is inherited from a collocated luma block.

10. A method of encoding video data, the method comprising:
encoding a first syntax element that indicates whether all linear model (LM) modes are disabled for a sequence parameter set (SPS) of the video data;
determining a chroma intra prediction mode for a chroma block of a picture in a sequence of pictures associated with the SPS of the video data;
determining a chroma intra prediction mode index to specify the chroma intra prediction mode for the chroma block, wherein determining the chroma intra prediction mode index comprises:
selecting a particular value to specify that the chroma intra prediction mode for the chroma block is inherited from a collocated luma block, wherein the collocated luma block is collocated with the chroma block and the particular value is a same value regardless of whether the first syntax element indicates that all the LM modes are disabled for the picture, and
responsive to the first syntax element indicating all the LM modes are not disabled for the picture, determining that the chroma prediction mode index indicates a cross-component linear model intra prediction mode; and
encoding a second syntax element that indicates the chroma prediction mode index for the chroma block of the picture, wherein encoding the second syntax element comprises encoding the second syntax element using a binarization table that is a same binarization table regardless of whether or not the first syntax element indicates that all the LM modes are disabled for the picture.

11. The method of claim 10, wherein the binarization table specifies different fixed length codes for different chroma prediction mode indexes.

12. The method of claim 10, wherein the binarization table specifies variable length codes for at least some chroma prediction mode indexes.

13. The method of claim 10, wherein the binarization table specifies Golomb codes for different chroma prediction mode indexes.

14. The method of claim 10, wherein the chroma prediction mode index defines a chroma prediction mode from a group of chroma prediction modes consisting of:
mode index 0—planar mode;
mode index 1—vertical mode;
mode index 2—horizontal mode;
mode index 3—DC mode;
mode index 4—DM_Chroma mode;
mode index 5—LM_Chroma mode;
mode index 6—LM_L mode; and
mode index 7—LM_A mode.

15. The method of claim 10, wherein encoding the second syntax element using the binarization table comprises:
encoding a bin string for the second syntax element based on the chroma prediction mode index using the binarization table.

16. The method of claim 15, wherein the binarization table comprises:

| Chroma prediction mode index | Bin string |
| --- | --- |
| 4 | 00 |
| 0 | 0100 |
| 1 | 0101 |
| 2 | 0110 |
| 3 | 0111 |
| 5 | 10 |
| 6 | 110 |
| 7 | 111 |

17. The method of claim 10, wherein encoding the second syntax element using the binarization table comprises:
using the binarization table to determine a bin string based on the chroma prediction mode index;
excluding from encoded video data, a first portion of the bin string associated with a chroma prediction mode used to encode the chroma block of the picture, wherein the first portion is inferable based on the value of the first syntax element; and
including in the encoded video data a second portion of the bin string associated with the chroma prediction mode used to encode the chroma block of the picture.

18. The method of claim 10, wherein encoding the second syntax element comprises:
using the binarization table to determine a bin string for the second syntax element based on the chroma prediction mode index; and
applying a context adaptive binary arithmetic coding (CABAC) technique to encode the bin string for the second syntax element,
wherein applying the CABAC technique to encode the bin string for the second syntax element comprises, based on the first syntax element indicating that all the LM modes are disabled for the picture:
using a first context to encode of a first-occurring bin of the bin string for the second syntax element; and
using a second context to encode a second-occurring bin of the bin string for the second syntax element depending on a value of the first bin of the bin string for the second syntax element, wherein the first and second contexts are different from each other, and the second-occurring bin indicates whether or not the chroma intra prediction mode for the chroma block is inherited from a collocated luma block.

19. A video decoding device comprising:
a memory configured to store video data; and
processing circuitry configured to:
decode a first syntax element that indicates whether all linear model (LM) modes are disabled for a sequence parameter set (SPS) of the video data;
decode a second syntax element that indicates a chroma prediction mode index for a chroma block of a picture in a sequence of pictures associated with the SPS of the video data;
determine a chroma intra prediction mode for the chroma block based on the chroma intra prediction mode index, wherein to determine the chroma intra prediction mode for the chroma block, the processing circuitry is configured to:
determine, based on the chroma prediction mode index for the chroma block being equal to a particular value, that the chroma intra prediction mode for the chroma block is inherited from a collocated luma block, wherein the collocated luma block is collocated with the chroma block and the particular value is a same value regardless of whether the first syntax element indicates that all LM modes are disabled for the picture, and
responsive to the first syntax element indicating all LM modes are not disabled for the picture, determine that the chroma prediction mode index indicates a cross component linear model intra prediction mode; and
decode the chroma block based on the chroma intra prediction mode for the chroma block, wherein the processing circuitry is configured to decode the second syntax element using a binarization table that is a same binarization table regardless of whether or not the first syntax element indicates that all LM modes are disabled for the picture.

20. The video decoding device of claim 19, wherein the binarization table specifies different fixed length codes for different chroma prediction mode indexes.

21. The video decoding device of claim 19, wherein the binarization table specifies variable length codes for at least some chroma prediction mode indexes.

22. The video decoding device of claim 19, wherein the binarization table specifies Golomb codes for different chroma prediction mode indexes.

23. The video decoding device of claim 19, wherein the chroma prediction mode index defines a chroma prediction mode from a group of chroma prediction modes consisting of:
mode index 0—planar mode;
mode index 1—vertical mode;
mode index 2—horizontal mode;
mode index 3—DC mode;
mode index 4—DM_Chroma mode;
mode index 5—LM_Chroma mode;
mode index 6—LM_L mode; and
mode index 7—LM_A mode.

24. The video decoding device of claim 19, wherein in using the binarization table the processing circuitry is configured to:
determine a bin string for the second syntax element; and
use the binarization table to determine the chroma prediction mode index from the bin string.

25. The video decoding device of claim 24, wherein the binarization table comprises:

| Chroma prediction mode index | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

26. The video decoding device of claim 19,
wherein to decode the second syntax element using the binarization table, the processing circuitry is configured to:
determine a bin string for the second syntax element; and
use the binarization table to determine the chroma prediction mode index from the bin string, and
wherein to determine the bin string for the second syntax element, the processing circuitry is configured to:
infer a first portion of the bin string associated with a chroma prediction mode used to decode the chroma block of the picture based on the value of the first syntax element; and
determine a second portion of the bin string associated with the chroma prediction mode used to decode the chroma block of the picture based on the value of the second syntax element.

27. The video decoding device of claim 19,
wherein to decode the second syntax element, the processing circuitry is configured to:
apply a context adaptive binary arithmetic coding (CABAC) technique to determine a bin string for the second syntax element; and
use the binarization table to determine the chroma prediction mode index from the bin string,
wherein to apply the CABAC technique to determine the bin string for the second syntax element the processing circuitry is configured to, based on the first syntax element indicating that all LM modes are disabled for the picture:
use a first context to decode of a first-occurring bin of the bin string; and
use a second context to decode a second-occurring bin of the bin string depending on a value of the first bin of the bin string, wherein the first and second contexts are different from each other, and the second-occurring bin indicates whether or not the chroma intra prediction mode for the chroma block is inherited from a collocated luma block.

28. A video encoding device comprising:
a memory configured to store video data; and
processing circuitry configured to:
encode a first syntax element that indicates whether all linear model (LM) modes are disabled for a sequence parameter set (SPS) of the video data;
determine a chroma intra prediction mode for a chroma block of a picture in a sequence of pictures associated with the SPS of the video data;
determine a chroma prediction mode index to specify the chroma intra prediction mode for the chroma block,
wherein to determine the chroma intra prediction mode index, the processing circuitry is configured to:
select a particular value to specify that the chroma intra prediction mode for the chroma block is inherited from a collocated luma block, wherein the collocated luma block is collocated with the chroma block and the particular value is a same value regardless of whether the first syntax element indicates that all LM modes are disabled for the picture, and
responsive to the first syntax element indicating all LM modes are not disabled for the picture, determine that the chroma prediction mode index indicates a cross component linear model intra prediction mode; and
encode a second syntax element that indicates the chroma prediction mode index for the chroma block of the picture, wherein the processing circuitry is configured to encode the second syntax element using a binarization table that is a same binarization table regardless of whether or not the first syntax element indicates that all LM modes are disabled for the picture.

29. The video encoding device of claim 28, wherein the binarization table specifies different fixed length codes for different chroma prediction mode indexes.

30. The video encoding device of claim 28, wherein the binarization table specifies variable length codes for at least some chroma prediction mode indexes.

31. The video encoding device of claim 28, wherein the binarization table specifies Golomb codes for different chroma prediction mode indexes.

32. The video encoding device of claim 28, wherein the chroma prediction mode index defines a chroma prediction mode from a group of intra prediction modes consisting of:
mode index 0—planar mode;
mode index 1—vertical mode;
mode index 2—horizontal mode;
mode index 3—DC mode;
mode index 4—DM_Chroma mode;
mode index 5—LM_Chroma mode;
mode index 6—LM_L mode; and
mode index 7—LM_A mode.

33. The video encoding device of claim 28, wherein to encode the second syntax element using a binarization table, the processing circuitry is configured to:
encode a bin string for the second syntax element based on the chroma prediction mode index using the binarization table.

34. The video encoding device of claim 33, wherein the binarization table comprises:

| Chroma prediction mode index | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

35. The video encoding device of claim 28, wherein to encode the second syntax element using the binarization table, the processing circuitry is configured to:
use the binarization table to determine a bin string based on the chroma prediction mode index;

exclude from encoded video data, a first portion of the bin string associated with a chroma prediction mode used to encode the chroma block of the picture, wherein the first portion is inferable based on the value of the first syntax element; and include in the encoded video data a second portion of the bin string associated with the chroma prediction mode used to encode the chroma block of the picture.

36. The video encoding device of claim 28,
wherein to encode the second syntax element using the binarization table, the processing circuitry is configured to:
use the binarization table to determine a bin string based on the chroma prediction mode index; and
apply a context adaptive binary arithmetic coding (CABAC) technique to encode the bin string for the second syntax element,
wherein to apply the CABAC technique to encode the bin string the processing circuitry is configured to, based on the first syntax element indicating that all LM modes are disabled for the picture:
use a first context to encode of a first-occurring bin of the bin string; and
use a second context to encode a second-occurring bin of the bin string depending on a value of the first bin of the bin string, wherein the first and second contexts are different from each other, and the second-occurring bin indicates whether or not the chroma intra prediction mode for the chroma block is inherited from a collocated luma block.

37. A video decoding device comprising:
means for decoding a first syntax element that indicates whether all linear model (LM) modes are disabled for a sequence parameter set (SPS) of the video data;
means for decoding a second syntax element that indicates a chroma prediction mode index for a chroma block of a picture in a sequence of pictures associated with the SPS of the video data;
means for determining a chroma intra prediction mode for the chroma block based on the chroma prediction mode index, wherein the means for determining the chroma intra prediction mode for the chroma block comprises:
means for determining, based on the chroma prediction mode index for the chroma block being equal to a particular value, that the chroma intra prediction mode for the chroma block is inherited from a collocated luma block, wherein the collocated luma block is collocated with the chroma block and the particular value is a same value regardless of whether the first syntax element indicates that all LM modes are disabled for the picture, and
means for determining, responsive to the first syntax element indicating all LM modes are not disabled for the picture, that the chroma prediction mode index indicates a cross component linear model intra prediction mode; and
means for decoding the chroma block based on the chroma intra prediction mode for the chroma block, wherein the means for decoding the second syntax element comprises means for decoding the second syntax element using a binarization table that is a same binarization table regardless of whether or not the first syntax element indicates that all LM modes are disabled for the picture.

38. A video encoding device comprising:
means for encoding a first syntax element that indicates whether all linear model (LM) modes are disabled for a sequence parameter set (SPS) of the video data;
means for determining a chroma intra prediction mode for a chroma block of a picture in a sequence of pictures associated with the SPS of the video data;
means for determining a chroma prediction mode index to specify the chroma intra prediction mode for the chroma block, wherein the means for determining the chroma intra prediction mode index comprises:
means for selecting a particular value to specify that the chroma intra prediction mode for the chroma block is inherited from a collocated luma block, wherein the collocated luma block is collocated with the chroma block and the particular value is a same value regardless of whether the first syntax element indicates that all LM modes are disabled for the picture, and
means for determining, responsive to the first syntax element indicating all LM modes are not disabled for the picture, that the chroma prediction mode index indicates a cross-component linear model intra prediction mode; and
means for encoding a second syntax element that indicates the chroma prediction mode index for the chroma block of the picture, wherein the means for encoding the second syntax element comprises means for encoding the second syntax element using a binarization table that is a same binarization table regardless of whether or not the first syntax element indicates that all LM modes are disabled for the picture.

39. A non-transitory computer-readable storage medium storing instructions that, when executed, cause one or more processors of a video decoding device to:
decode a first syntax element that indicates whether all linear model (LM) modes are disabled for a sequence parameter set (SPS) of video data;
decode a second syntax element that indicates a chroma prediction mode index for a chroma block of a picture in a sequence of pictures associated with the SPS of the video data;
determine a chroma intra prediction mode for the chroma block based on the chroma prediction mode index, wherein to determine the chroma intra prediction mode for the chroma block, the instructions cause the one or more processors to:
determine, based on the chroma prediction mode index for the chroma block being equal to a particular value, that the chroma intra prediction mode for the chroma block is inherited from a collocated luma block, wherein the collocated luma block is collocated with the chroma block and the particular value is a same value regardless of whether the first syntax element indicates that all LM modes are disabled for the picture, and
responsive to the first syntax element indicating all LM modes are not disabled for the picture, determine that the chroma prediction mode index indicates a cross-component linear model intra prediction mode; and
decode the chroma block based on the chroma intra prediction mode for the chroma block, wherein the instructions cause the one or more processors to decode the second syntax element using a binarization table that is a same binarization table regardless of whether or not the first syntax element indicates that all LM modes are disabled for the picture.

40. A non-transitory computer-readable storage medium storing instructions that, when executed, cause one or more processors of a video encoding device to:
- encode a first syntax element that indicates whether all linear model (LM) modes are disabled for a sequence parameter set (SPS) of video data;
- determine a chroma intra prediction mode for a chroma block of a picture in a sequence of pictures associated with the SPS of the video data;
- determine a chroma prediction mode index to specify the chroma intra prediction mode for
- the chroma block, wherein to determine the chroma intra prediction mode index, the instructions cause the one or more processors to:
  - select a particular value to specify that the chroma intra prediction mode for the chroma block is inherited from a collocated luma block, wherein the collocated luma block is collocated with the chroma block and the particular value is a same value regardless of whether the first syntax element indicates that all LM modes are disabled for the picture, and
  - responsive to the first syntax element indicating all LM modes are not disabled for the picture, determine that the chroma prediction mode index indicates a cross-component linear model intra prediction mode; and
- encode a second syntax element that indicates the chroma prediction mode index for the chroma block of the picture, wherein the instructions cause the one or more processors to encode the second syntax element using a binarization table that is a same binarization table regardless of whether or not the first syntax element indicates that all LM modes are disabled for the picture.

* * * * *